US010164768B1

(12) United States Patent
Ramaraju et al.

(10) Patent No.: US 10,164,768 B1
(45) Date of Patent: Dec. 25, 2018

(54) METHOD AND APPARATUS FOR DIFFERENTIAL POWER ANALYSIS (DPA) RESILIENCE SECURITY IN CRYPTOGRAPHY PROCESSORS

(71) Applicant: QUALCOMM Incorporated, San Diego, CA (US)

(72) Inventors: Ravindraraj Ramaraju, San Diego, CA (US); Rakesh Vattikonda, Austin, TX (US); Samrat Sinharoy, San Diego, CA (US); De Lu, San Diego, CA (US); Bo Pang, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/904,222

(22) Filed: Feb. 23, 2018

(51) Int. Cl.
*H04L 9/00* (2006.01)
*H03K 19/00* (2006.01)

(52) U.S. Cl.
CPC ......... *H04L 9/003* (2013.01); *H03K 19/0013* (2013.01); *H04L 2209/125* (2013.01)

(58) Field of Classification Search
None
See application file for complete search history.

(56) References Cited

U.S. PATENT DOCUMENTS 5,479,112 A * 12/1995 Choi ............... H03K 19/00323
326/121
7,692,449 B2 4/2010 Verbauwhede et al.
8,390,311 B2 3/2013 Kyue et al.
8,947,123 B2 2/2015 Verbauwhede et al.
2017/0169220 A1 6/2017 Fish et al.

FOREIGN PATENT DOCUMENTS

WO WO-2017096059 A1 6/2017

OTHER PUBLICATIONS

Monteiro, Cancio, et al, Process Variation Verification of Low-Power Secure CSSAL AES S-box Circuit, 2014 IEEE 57th International Midwest Symposium, Aug. 3-6, 2014, pp. 21-24.

* cited by examiner

*Primary Examiner* — Jany Richardson
(74) *Attorney, Agent, or Firm* — Loza & Loza, LLP/Qualcomm

(57) ABSTRACT

In certain aspects, a circuit includes a dynamic differential logic gate having first and second outputs, and a first static differential logic gate having first and second outputs, and first and second inputs coupled to the first and second outputs, respectively, of the dynamic differential logic gate. The dynamic differential logic gate is configured to receive a clock signal and to preset both the first and second outputs of the dynamic differential logic gate to a first preset value during a first phase of the clock signal. The first static differential logic gate is configured to preset both the first and second outputs of the first static differential logic gate to a second preset value when the first preset value is input to both the first and second inputs of the first static differential logic gate.

27 Claims, 17 Drawing Sheets

Truth Table

| a | b | $\bar{a}$ | $\bar{b}$ | Out | $\overline{Out}$ |
|---|---|---|---|---|---|
| 0 | 0 | 1 | 1 | 0 | 1 |
| 0 | 1 | 1 | 0 | 1 | 0 |
| 1 | 0 | 0 | 1 | 1 | 0 |
| 1 | 1 | 0 | 0 | 0 | 1 |

FIG. 6A

Preset Table 1

| a | b | $\bar{a}$ | $\bar{b}$ | Out | $\overline{Out}$ |
|---|---|---|---|---|---|
| 0 | 0 | 0 | 0 | 1 | 1 |

FIG. 6B

Preset Table 2

| a | b | $\bar{a}$ | $\bar{b}$ | Out | $\overline{Out}$ |
|---|---|---|---|---|---|
| 1 | 1 | 1 | 1 | 0 | 0 |

FIG. 6C

Truth Table

| a | b | $\bar{a}$ | $\bar{b}$ | Out | $\overline{\text{Out}}$ |
|---|---|---|---|---|---|
| 0 | 0 | 1 | 1 | 0 | 1 |
| 0 | 1 | 1 | 0 | 0 | 1 |
| 1 | 0 | 0 | 1 | 0 | 1 |
| 1 | 1 | 0 | 0 | 1 | 0 |

FIG. 11A

Preset Table 1

| a | b | $\bar{a}$ | $\bar{b}$ | Out | $\overline{\text{Out}}$ |
|---|---|---|---|---|---|
| 0 | 0 | 0 | 0 | 1 | 1 |

FIG. 11B

Preset Table 2

| a | b | $\bar{a}$ | $\bar{b}$ | Out | $\overline{\text{Out}}$ |
|---|---|---|---|---|---|
| 1 | 1 | 1 | 1 | 0 | 0 |

FIG. 11C

Truth Table

| a | b | $\bar{a}$ | $\bar{b}$ | Out | $\overline{Out}$ |
|---|---|---|---|---|---|
| 0 | 0 | 1 | 1 | 0 | 1 |
| 0 | 1 | 1 | 0 | 1 | 0 |
| 1 | 0 | 0 | 1 | 1 | 0 |
| 1 | 1 | 0 | 0 | 1 | 0 |

FIG. 13A

Preset Table 1

| a | b | $\bar{a}$ | $\bar{b}$ | Out | $\overline{Out}$ |
|---|---|---|---|---|---|
| 0 | 0 | 0 | 0 | 1 | 1 |

FIG. 13B

Preset Table 2

| a | b | $\bar{a}$ | $\bar{b}$ | Out | $\overline{Out}$ |
|---|---|---|---|---|---|
| 1 | 1 | 1 | 1 | 0 | 0 |

FIG. 13C

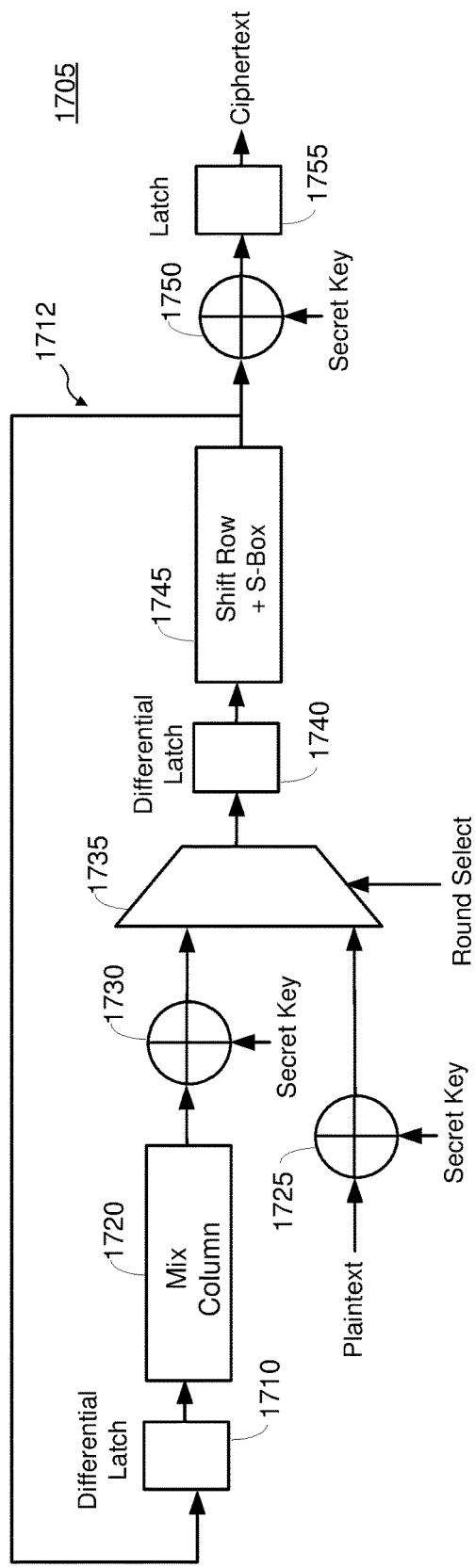
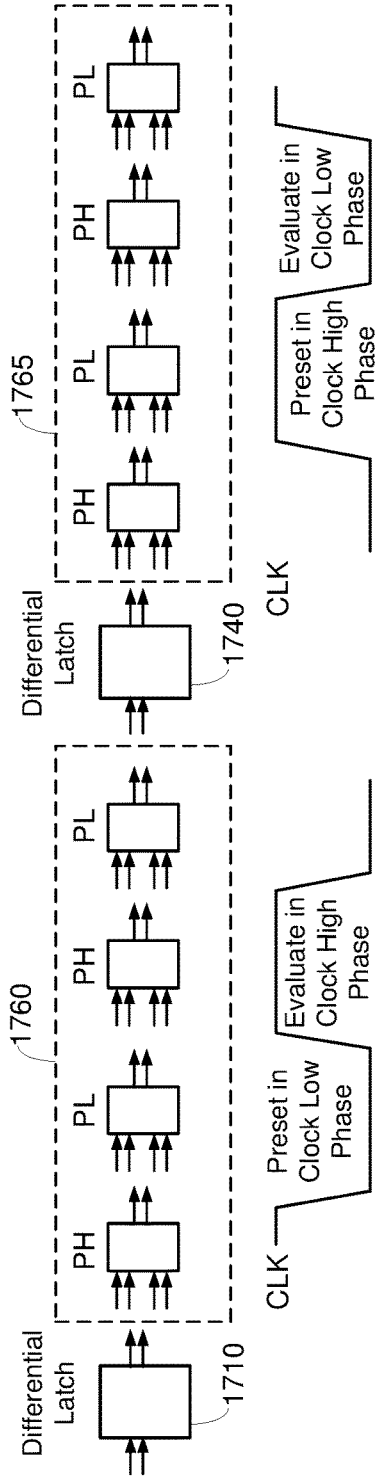
FIG. 17A
FIG. 17B

METHOD AND APPARATUS FOR DIFFERENTIAL POWER ANALYSIS (DPA) RESILIENCE SECURITY IN CRYPTOGRAPHY PROCESSORS

BACKGROUND

Field

Aspects of the present disclosure relate generally to processors, and more particularly, to processors resilient to differential power analysis (DPA) attacks.

Background

Sensitive data may be encrypted on a sending device to provide secure communication of the data to a receiving device. For example, the sending device may encrypt the data using a secret key and the receiving device may decrypt the encrypted data using the secret key, in which the secret key is known only to the sending device and the receiving device. To maintain security, the secret key needs to be protected from not only software attacks but also hardware attacks. An increasingly popular technique for an attacker to retrieve the secret key is differential power analysis (DPA), in which the attacker measures the power profile of a cryptography processor on the sending device and/or receiving device to discern the unique power signatures of ones and zeros. This allows the attacker to retrieve the secret key after compiling and analyzing enough power measurements.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a circuit. The circuit includes a dynamic differential logic gate having first and second outputs, and a first static differential logic gate having first and second outputs, and first and second inputs coupled to the first and second outputs, respectively, of the dynamic differential logic gate. The dynamic differential logic gate is configured to receive a clock signal and to preset both the first and second outputs of the dynamic differential logic gate to a first preset value during a first phase of the clock signal. The first static differential logic gate is configured to preset both the first and second outputs of the first static differential logic gate to a second preset value when the first preset value is input to both the first and second inputs of the first static differential logic gate.

A second aspect relates to a processor. The processor includes a first differential latch configured to latch first complementary data, and to output the latched first complementary data. The processor also includes a first pipeline configured to perform first operations on the latched first complementary data to generate second complementary data. The first pipeline includes one or more dynamic differential logic gates in a first stage of the first pipeline, and one or more static differential logic gates in a second stage of the first pipeline. Each of the one or more dynamic differential logic gates in the first stage is configured to receive a clock signal and to preset respective outputs to a first preset value during a first phase of the clock signal.

A third aspect relates to a differential logic gate. The differential logic gate includes a first logic gate and a second logic gate. The first logic gate includes a first plurality of p-type field effect transistors (PFETs) coupled in series between a first output and a supply rail, a second plurality of PFETs coupled in series between the first output and the supply rail, a first plurality of n-type field effect transistors (NFETs) coupled in series between the first output and a ground, and a second plurality of NFETs coupled in series between the first output and the ground. The second logic gate includes a third plurality of PFETs coupled in series between a second output and the supply rail, a fourth plurality of PFETs coupled in series between the second output and the supply rail, a third plurality of NFETs coupled in series between the second output and the ground, and a fourth plurality of NFETs coupled in series between the second output and the ground. The differential logic gate also includes a plurality of inputs coupled to gates of the first, second, third and fourth pluralities of PFETs and gates of the first, second, third and fourth pluralities of NFETs such that the differential logic gate performs a differential logic function when a first pair of complementary bits is input to first and second ones of the plurality of inputs, and a second pair of complementary bits is input to third and fourth ones of the plurality of inputs.

BRIEF DESCRIPTION OF THE DRAWINGS

FIG. 6A shows a truth table for the static differential XOR gate according to certain aspects of the present disclosure.

FIG. 6B shows a first preset table for the static differential XOR gate according to certain aspects of the present disclosure.

FIG. 6C shows a second preset table for the static differential XOR gate according to certain aspects of the present disclosure.

FIG. 11A shows a truth table for the static differential AND gate according to certain aspects of the present disclosure.

FIG. 11B shows a first preset table for the static differential AND gate according to certain aspects of the present disclosure.

FIG. 11C shows a second preset table for the static differential AND gate according to certain aspects of the present disclosure.

FIG. 13A shows a truth table for the static differential OR gate according to certain aspects of the present disclosure.

FIG. 13B shows a first preset table for the static differential OR gate according to certain aspects of the present disclosure.

FIG. 13C shows a second preset table for the static differential OR gate according to certain aspects of the present disclosure.

FIG. 17A shows an exemplary encryption processor according to certain aspects of the present disclosure.

FIG. 17B shows an exemplary implementation of a portion of the encryption processor according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
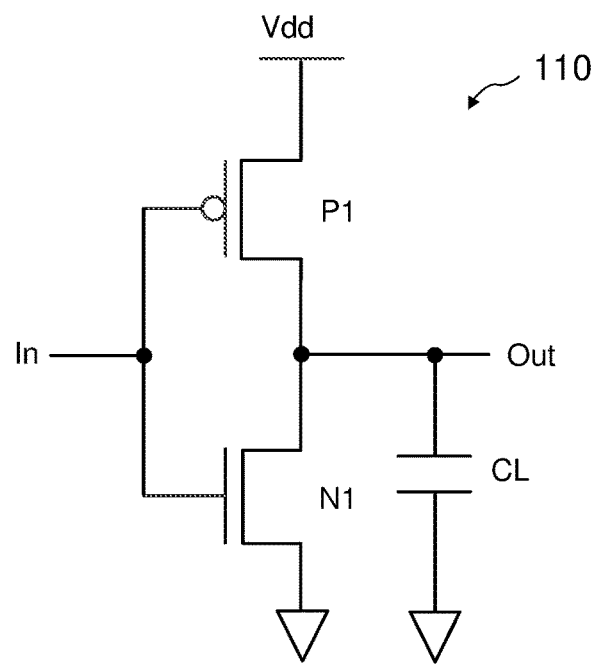
FIG. 1 shows an example of a logic gate that is vulnerable to a DPA attack.

FIG. 1 shows an example of a static logic gate 110 that is vulnerable to a differential power analysis (DPA) attack. The static logic gate 110 includes a p-type field effect transistor (PFET) P1 and an n-type field effect transistor (NFET) N1, in which the gates of the PFET P1 and the NFET N1 are coupled to the input (labeled "In") of the logic gate 110 and the drains of the PFET P1 and the NFET N1 are coupled to the output (labeled "Out") of the logic gate 110. The logic gate 110 also includes a load capacitor (labeled "CL") coupled to the output. In this example, the logic gate 110 implements an inverter.

When the input to the logic gate 110 switches from 1 to 0 (i.e., 1→0 transition), the capacitor CL is charged to the supply voltage Vdd through the PFET P1, resulting in a large spike in the supply current flow. When the input to the logic gate 110 switches from 0 to 1 (i.e., 0→1 transition), the capacitor CL discharges to ground through the NFET N1. Finally, when the input to the logic gate 110 stays the same for two adjacent input bits, there is approximately no current flow. In this case, the input stays one for two adjacent bits (i.e., 1→1 transition) or stays zero for two adjacent bits (i.e., 0→0 transition).

Thus, the supply current flow (and hence the power profile) of the logic gate 110 depends on the bit values at the input. The dependency of the power profile on the input bit values makes it possible for an attacker to discern the input bit values based on power measurements.

Figure 2:
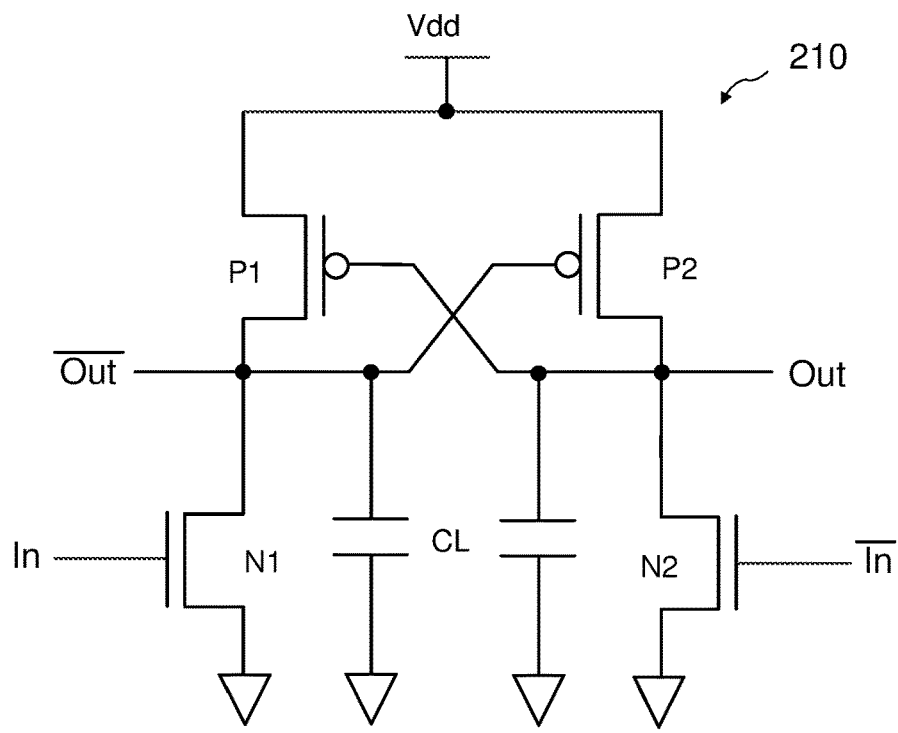
FIG. 2 shows an example of a static differential logic gate.

FIG. 2 shows an example of a static differential logic gate 210 that is less vulnerable to a DPA attack than the logic gate 110. The static differential logic gate 210 includes a first PFET P1, a second PFET P2, a first NFET N1, and a second NFET N2, in which the first PFET P1 and the second PFET P2 are cross coupled. The differential logic gate 210 is configured to receive a pair of complementary inputs (labeled "In" and "$\overline{\text{In}}$"), and output a pair of complementary outputs (labeled "Out" and "$\overline{\text{Out}}$"). In the discussion below, input In is referred to as the true input, and input $\overline{\text{In}}$ is referred to as the complement input. Also, output Out is referred to as the true output, and output $\overline{\text{Out}}$ is referred to as the complement output.

In this example, the differential logic gate 210 also includes two load capacitors (labeled "CL"), where one of the load capacitors is coupled to the true output Out and the other one of the load capacitors is coupled to the complement output $\overline{\text{Out}}$. When the true input In to the differential logic gate 210 switches from 1 to 0 (i.e., 1→0 transition), the load capacitor coupled to the true output Out is discharged to ground and the load capacitor coupled to the complement output $\overline{\text{Out}}$ is charged to the supply voltage Vdd. When the true input In to the logic gate 210 switches from 0 to 1 (i.e., 0→1 transition), the load capacitor coupled to the true output Out is charged to the supply voltage Vdd and the load capacitor coupled to the complement output $\overline{\text{Out}}$ is discharged to ground. Note that the complement input $\overline{\text{In}}$ switches in the opposite direction as the true input In.

Thus, when the true input In switches logic values (i.e., 1→0 or 0→1), one of the load capacitors is charged while the other one of the load capacitors is discharged. If the load capacitors are balanced (i.e., have approximately the same capacitance), then the supply current flow for a 1→0 transition is approximately the same as the supply current flow for a 0→1 transition. In other words, the power profiles for a 1→0 transition and a 0→1 transition are approximately the same. This makes it difficult for an attacker to distinguish between a 1→0 transition and a 0→1 transition based on power measurements. In contrast, the logic gate 110 in FIG. 1 has a different power profile for a 1→0 transition than a 0→1 transition. Thus, the differential logic gate 210 is less vulnerable to a DPA attack than the logic gate 110.

When the input true In to the differential logic gate 210 stays the same for two adjacent input bits, there is approximately no current flow. Note that the complement input $\overline{\text{In}}$ also stays the same in this case. Thus, the power profile for the case where the true input In stays the same for two adjacent bits (i.e., 1→1 or 0→0) differs from the power profile for the case where the true input In switches logic values (i.e., 1→0 or 0→1). As a result, an attacker can still use power measurements to distinguish between the case where the true input In stays the same for two adjacent input bits and the case where the true input In switches logic values. This allows the attacker to use DPA to determine when data transitions occur at the input In. Therefore, while the differential logic gate 210 provides an attacker with less information than the logic gate 110 in FIG. 1, the differential logic gate 210 is still vulnerable to a DPA attack. Accordingly, a better solution to protect against DPA attacks is needed.

To improve protection against DPA attacks, dynamic differential logic gates are provided according to aspects of the present disclosure. The dynamic differential logic gates have approximately uniform power profiles for all possible input transitions (i.e., 1→0, 1→1, 0→0 and 0→1), as discussed further below. The uniform power profile makes it more difficult for an attacker to discern logic bit values based on power measurements, and therefore more difficult for the attacker to retrieve a secret key or other sensitive information.

Figure 3:
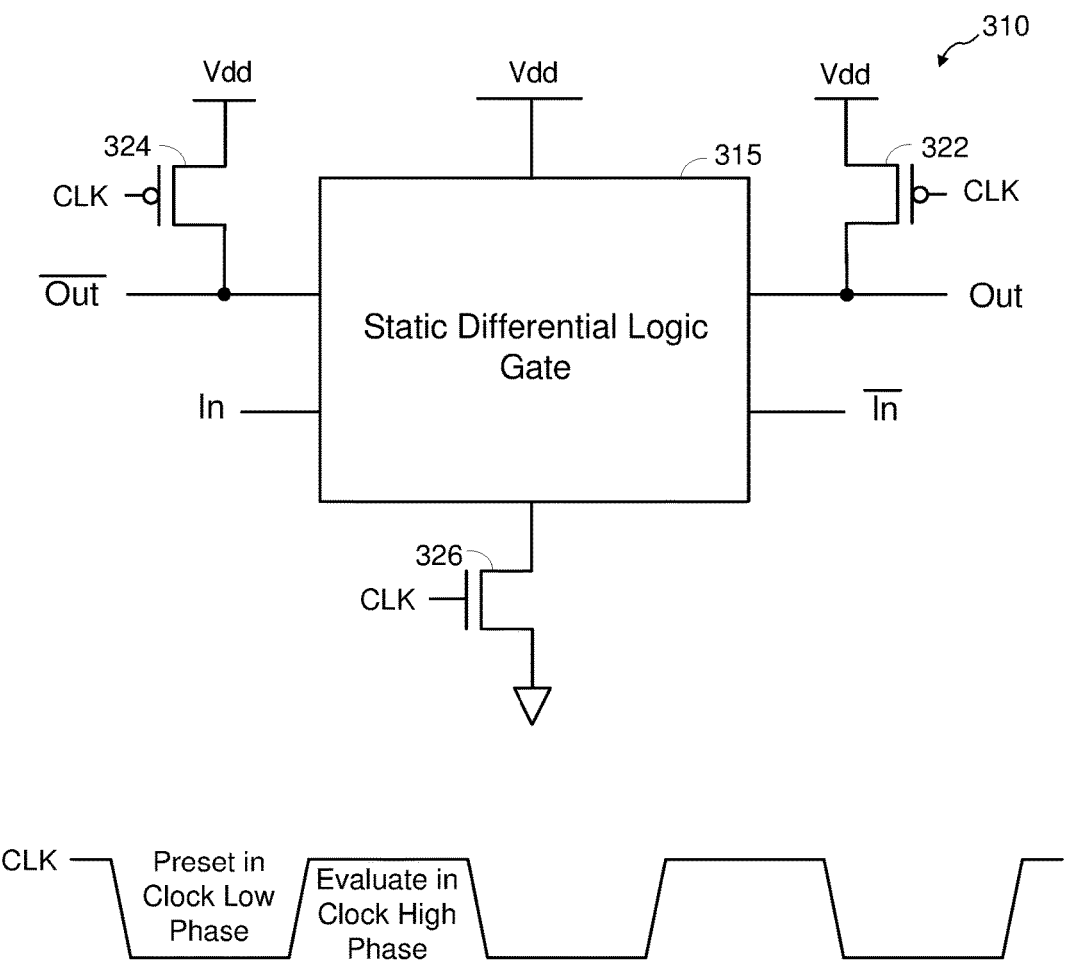
FIG. 3 shows an example of a dynamic differential logic gate according to certain aspects of the present disclosure.

FIG. 3 shows an example of a dynamic differential logic gate 310 according to certain aspects of the present disclosure. The dynamic differential logic gate 310 includes a static differential logic gate 315 that performs a logic operation on one or more pairs of complementary inputs (labeled "In" and "$\overline{\text{In}}$") to generate a pair of complementary outputs (labeled "Out" and "$\overline{\text{Out}}$"). Although one pair of complementary inputs is shown in FIG. 3 for simplicity, it is to be appreciated that multiple pairs of complementary inputs may be input to the static differential logic gate 315. The differential static logic gate 315 may perform any one of a variety of different logic operations, including, for example, an exclusive-or (XOR) operation, an OR operation, an AND operation, etc.

The dynamic differential logic gate 310 also includes clock transistors that make the dynamic differential logic gate 310 dynamic, as discussed further below. The clock transistors include a first PFET 322, a second PFET 324, and an NFET 326. The first PFET 322 is coupled between the true output Out of the static differential logic gate 315 and the supply rail Vdd, and the second PFET 324 is coupled between the complement output $\overline{\text{Out}}$ of the static differential logic gate 315 and the supply rail Vdd. The NFET 326 is coupled between the static differential logic gate 315 and ground. The gates of the first and second PFETs 322 and 324 and the gate of the NFET 326 are driven by a clock signal (labeled "CLK").

When the clock signal CLK is low (referred to as a "clock low phase"), the first and second PFETs 322 and 324 are turned on and the NFET 326 is tuned off. As a result, the first and second PFETs 322 and 324 couple both outputs Out and $\overline{\text{Out}}$ of the differential logic gate 315 to the supply rail Vdd. This presets both outputs Out and $\overline{\text{Out}}$ to Vdd (i.e., logic one) independent of the bit values at the inputs In and $\overline{\text{In}}$.

When the clock signal CLK is high (referred to as a "clock high phase"), the first and second PFETs 322 and 324 are turned off and the NFET 326 is tuned on. This allows the static differential logic gate 315 to perform a logic operation on the inputs In and $\overline{\text{In}}$, and generate a corresponding pair of complementary outputs Out and $\overline{\text{Out}}$. Because the outputs Out and $\overline{\text{Out}}$ of the static differential logic gate 315 are complementary, the outputs Out and $\overline{\text{Out}}$ settle to opposite logic values (i.e., one of the outputs stays at the preset value of one while the other one of the outputs becomes zero). Thus, after both outputs are preset to one in the clock low phase, one of the outputs switches from one to zero in the clock high phase while the other one of the outputs stays at one. The output that switches from one to zero depends on the bit values at the inputs In and $\overline{\text{In}}$ and the logic operation performed by the differential logic gate 315.

Therefore, during each cycle (i.e., period) of the clock signal CLK, the outputs Out and $\overline{\text{Out}}$ are preset to one in the respective clock low phase, and one of the outputs switches from one to zero in the respective clock high phase due to the complementary nature of the outputs Out and $\overline{\text{Out}}$. If the differential logic gate 315 is balanced (i.e., same capacitance on both sides of the differential logic gate 315), then the power profile for the true output Out switching from one to zero is approximately the same as the power profile for the complement output $\overline{\text{Out}}$ switching from one to zero.

Because one of the outputs Out and $\overline{\text{Out}}$ switches from one to zero during the clock high phase of each clock cycle and the power profile for the true output Out switching from one to zero is approximately the same as the power profile for the complement output $\overline{\text{Out}}$ switching from one to zero, the power profile for each clock cycle is approximately the same. Note that one of the outputs Out and $\overline{\text{Out}}$ switches from one to zero in each clock cycle even if adjacent input bits are the same. This is because both outputs Out and $\overline{\text{Out}}$ are preset to one during the clock low phase of each clock cycle, which results in one of the outputs Out and $\overline{\text{Out}}$ switching from one to zero during the following clock high phase. In other words, presetting both outputs Out and $\overline{\text{Out}}$ to one during the clock low phase ensures that one of the outputs switches from one to zero during the clock high phase even if the input bits stay the same.

Therefore, the power profile of the dynamic differential logic gate 310 is approximately uniform across clock cycles independent of the input transitions (i.e., 1→0, 1→1, 0→0 and 0→1). The uniform power profile makes it very difficult for an attacker to discern logic bit values based on power measurements.

In the above example, both outputs Out and $\overline{\text{Out}}$ are preset to one during each clock cycle. However, it is to be appreciated that the present disclosure is not limited to this example. Alternatively, both outputs Out and $\overline{\text{Out}}$ may be preset to zero during each clock cycle. In this example, one of the outputs Out and $\overline{\text{Out}}$ switches from zero to one after each preset due to the complementary nature of the outputs. The complementary nature of the outputs ensures that one of the outputs switches logic values after each preset, and balancing the structure of the differential logic gate 315 helps ensure that the power profile is the same regardless of which one of the outputs switches logic values.

In the above example, the outputs Out and $\overline{\text{Out}}$ are preset during a clock low phase and evaluated during a clock high phase. However, the present disclosure is not limited to this example. Alternatively, the outputs Out and $\overline{\text{Out}}$ may be preset during a clock high phase and evaluated during a clock low phase. This may be accomplished, for example, by inverting the clock signal CLK, and driving the gates of the clock transistors 322, 324 and 326 with the inverted clock signal.

Figure 4:
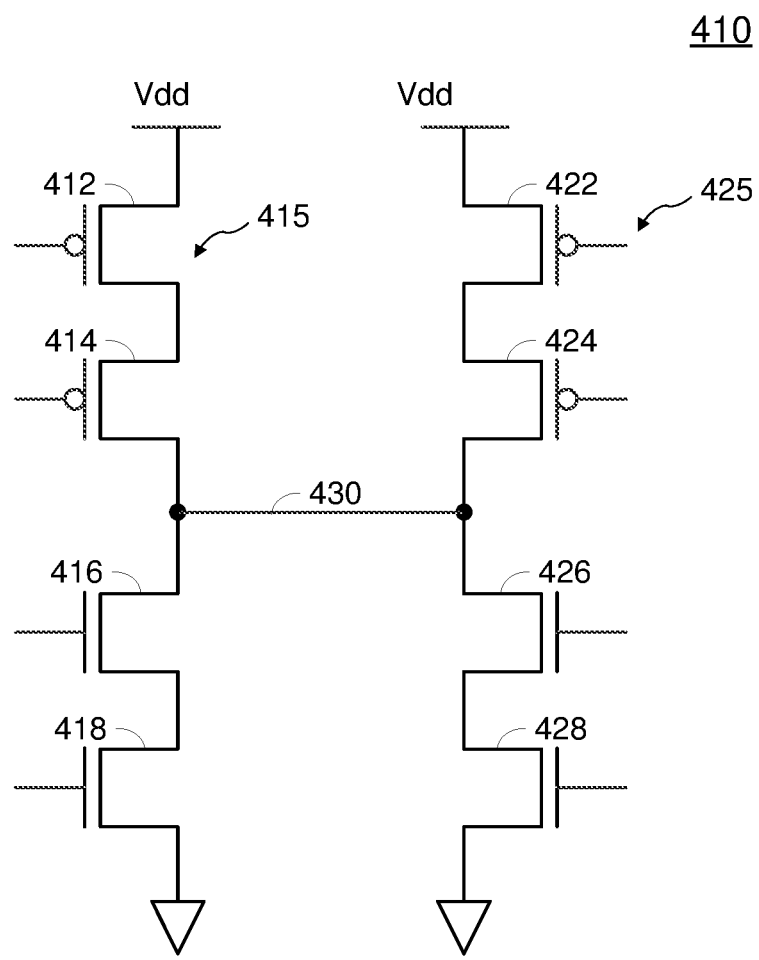
FIG. 4 shows an example of a circuit block that may be used to implement differential logic gates according to certain aspects of the present disclosure.

FIG. 4 shows an exemplary circuit block 410 according to certain aspects of the present disclosure. The circuit block 410 may be used to implement an XOR gate, an XNOR gate, an OR gate, a NOR gate, an AND gate, or a NAND gate, as discussed further below. The circuit block 410 includes a first stack of transistors 415, and a second stack of transistors 425.

The first stack of transistors 415 includes a first PFET 412, a second PFET 414, a first NFET 416 and a second NFET 418. The first PFET 412 and the second PFET 414 are coupled in series between the supply rail Vdd and an output node 430, and the first NFET 416 and the second NFET 418 are coupled in series between the output node 430 and ground.

The second stack of transistors 425 includes a third PFET 422, a fourth PFET 424, a third NFET 426 and a fourth NFET 428. The third PFET 422 and the fourth PFET 424 are coupled in series between the supply rail Vdd and the output node 430, and the third NFET 426 and the fourth NFET 428 are coupled in series between the output node 430 and ground.

As shown in FIG. 4, the first stack of transistors 415 is coupled to the second stack of transistors 425 at the output node 430. The output node 430 provides the output for the logic gate implemented with the circuit block 410. The capacitance at the output node 430 may include the drain-to-gate capacitances of the second PFET 414, the fourth PFET 424, the first NFET 416 and the third NFET 426.

As discussed above, the circuit block 410 may be used to implement an XOR gate, an XNOR gate, an OR gate, a NOR gate, an AND gate, or a NAND gate. In this regard, the block circuit 410 may be configured to implement any one of the above logic gates by coupling inputs to the gates of the transistors 412, 414, 416, 418, 422, 424, 426 and 428 according to the logic gate to be implemented, as discussed further below.

Figure 5:
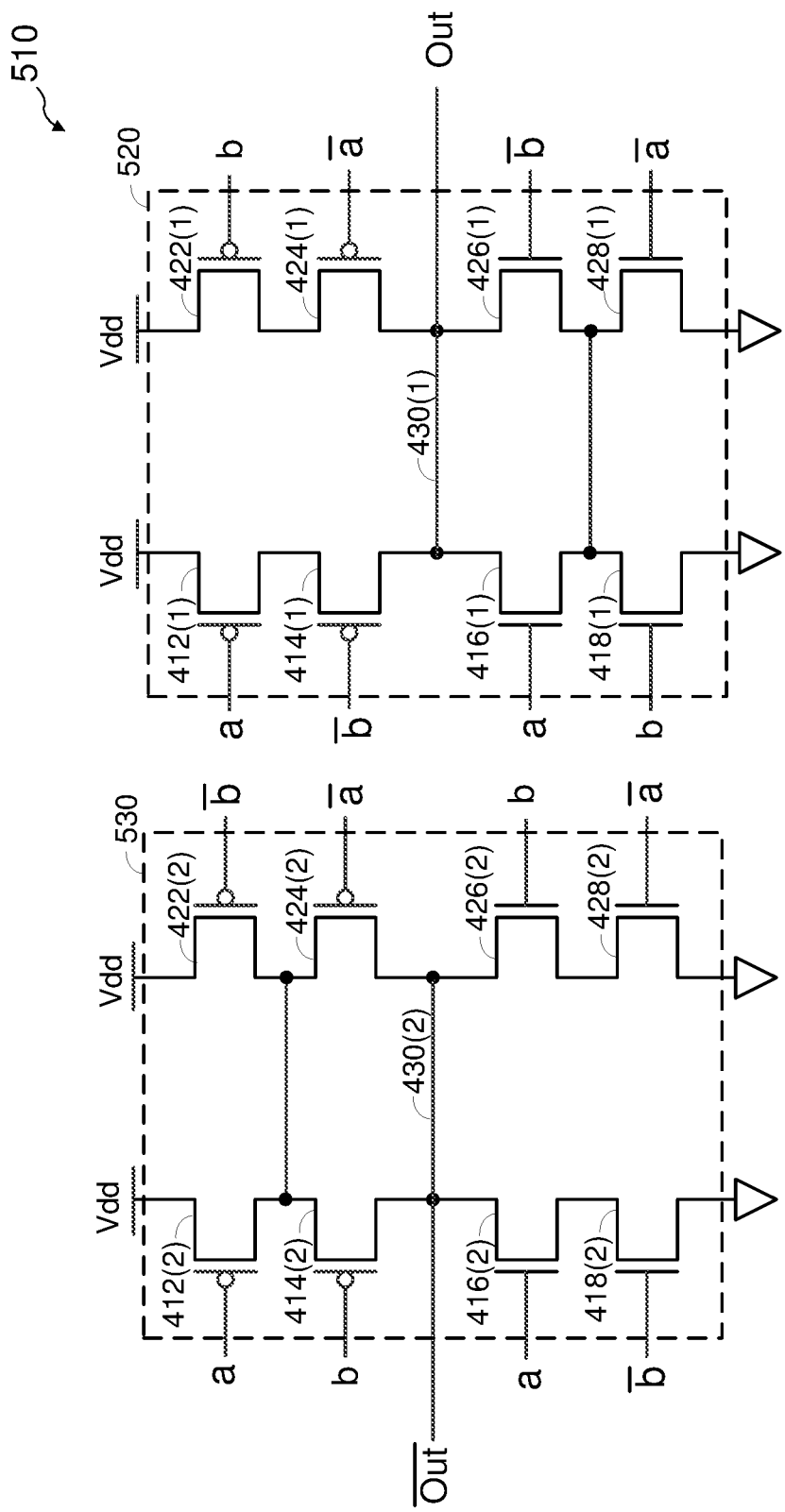
FIG. 5 shows an example of a static differential XOR gate according to certain aspects of the present disclosure.

FIG. 5 shows an example of a static differential XOR gate 510 that is implemented based on the circuit block 410 shown in FIG. 4 according to certain aspects of the present disclosure. In this example, the static differential XOR gate 510 includes inputs a, $\bar{a}$, b and $\bar{b}$. As discussed further below, inputs a and $\bar{a}$ are configured to receive a first pair of complementary data bits, and inputs b and $\bar{b}$ are configured to receive a second pair of complementary data bits. Each of the inputs may be implemented with a metal structure that is coupled to the gates of a respective subset of the transistors in the static differential XOR gate.

The static differential XOR gate 510 is configured to perform a differential XOR operation on the first and second pairs of complementary data bits to generate a pair of complementary output data bits, which is output from outputs Out and $\overline{Out}$. In the discussion below, output Out is referred to as the true output and output $\overline{Out}$ is referred to as the complement output.

The static differential XOR gate 510 includes a single-output XOR gate 520 and a single-output XNOR gate 530. The single-output XOR gate 520 provides the true output Out of the differential XOR gate 510, and the single-output XNOR gate 530 provides the complement output $\overline{Out}$ of the differential XOR gate 510. The XNOR gate 530 is the complement (i.e., inverse) of the XOR gate 520. Thus, in this example, the static differential XOR gate 510 is implemented using a pair of complementary single-output logic gates.

Each of the XOR gate 520 and the XNOR gate 530 is implemented with a separate instance (i.e., copy) of the circuit block 410. The reference number for each transistor in the XOR gate 520 includes a one in parenthesis and the reference number for each transistor in the XNOR 530 includes a two in parenthesis in order to distinguish between the two separate instances (i.e., copies) of the circuit block 410.

In the example shown in FIG. 5, the XOR gate 520 is implemented by coupling input a to the gates of the first PFET 412(1) and the first NFET 416(1), coupling input a to the gates of the fourth NFET 428(1) and the fourth PFET 424(1), coupling input b to the gates of the second NFET 418(1) and the third PFET 422(1), and coupling input b to the gates of the second PFET 414(1) and the third NFET 426(1). The node between the first and second NFETs 416(1) and 418(1) is coupled to the node between the third and the fourth NFETs 426(1) and 428(1). The output node 430(1) provides the true output Out of the differential XOR gate 510.

The XNOR gate 530 is implemented by coupling input a to the gates of the first PFET 412(2) and the first NFET 416(2), coupling input a to the gates of the fourth PFET 424(2) and the fourth NFET 428(2), coupling input b to the gates of the second PFET 414(2) and the third NFET 426(2), and coupling input b to the gates of the second NFET 418(2) and the third PFET 422(2). The node between the first and second PFETs 412(2) and 414(2) is coupled to the node between the third and the fourth PFETs 422(2) and 424(2). The output node 430(2) provides the complement output Out of the differential XOR gate 510.

FIG. 6A shows a truth table for the differential XOR gate 510, in which inputs a and $\bar{a}$ have complementary logic values, and inputs b and $\bar{b}$ have complementary logic values. As can be seen from the truth table, the outputs Out and $\overline{Out}$ have complementary logic values. The true output Out is one when inputs a and b have different logic values, and is zero when inputs a and b have the same logic value.

Figure 7:
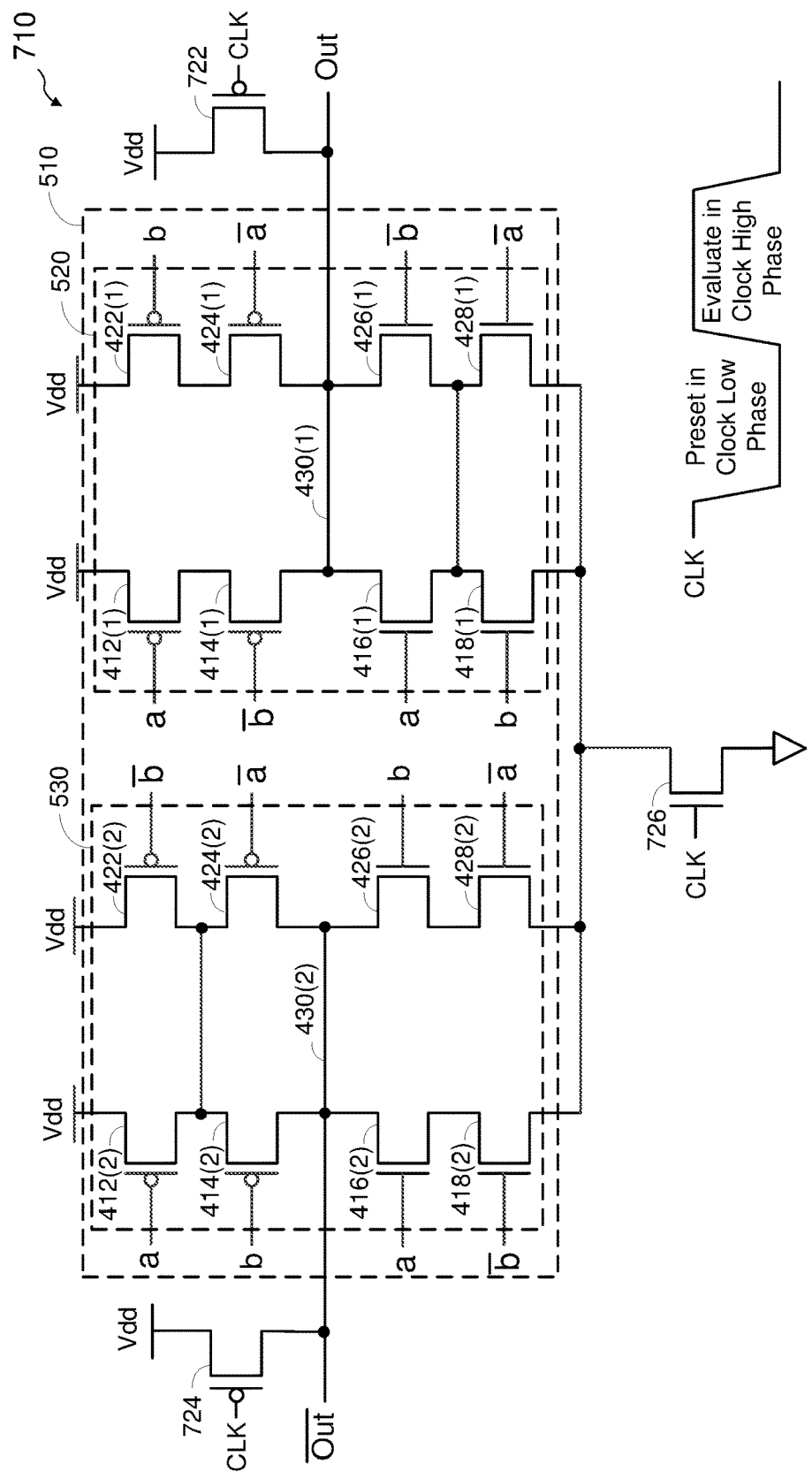
FIG. 7 shows an example of a dynamic differential XOR gate according to certain aspects of the present disclosure.

The static differential XOR gate 510 may be used to implement a dynamic differential XOR gate. In this regard, FIG. 7 shows an example of a dynamic differential XOR gate 710 according to certain aspects of the present disclosure. The dynamic differential XOR gate 710 include the static differential XOR gate 510 and clock transistors. The clock transistors include a first clock PFET 722, a second clock PFET 724, and a clock NFET 726. The first clock PFET 722 is coupled between the true output Out of the static differential XOR gate 510 and the supply rail Vdd. Since the single-output XOR gate 520 provides the true output Out of the static differential XOR gate 510, the first clock PFET 722 is coupled between the output of the XOR gate 520 and the supply rail Vdd. The second PFET 724 is coupled between the complement output $\overline{Out}$ of the differential XOR gate 510 and the supply rail Vdd. Since the single-output XNOR gate 530 provides the complement output $\overline{Out}$ of the static differential XOR gate 510, the second clock PFET 724 is coupled between the output of the XNOR gate 530 and the supply rail Vdd. The clock NFET 726 is coupled between the static differential XOR gate 510 and ground. More particularly, the clock NFET 726 is coupled between the single-output XOR gate 520 and ground, and between the single-output XNOR gate 530 and ground. The gates of the first and second clock PFETs 722 and 724 and the gate of the clock NFET 726 are driven by a clock signal (labeled "CLK").

When the clock signal CLK is low (referred to as the "clock low phase"), the first and second clock PFETs 722 and 724 are turned on and the clock NFET 726 is tuned off. As a result, the first and second clock PFETs 722 and 724 couple both outputs Out and $\overline{Out}$ of the dynamic differential XOR gate 710 to the supply rail Vdd. Thus, both outputs Out and $\overline{Out}$ are preset to Vdd (i.e., logic one) in this example.

When the clock signal CLK is high (referred to as the "clock high phase"), the first and second clock PFETs 722 and 724 are turned off and the clock NFET 726 is tuned on. This allows the static differential XOR gate 510 to pull one of the outputs Out and $\overline{Out}$ to zero according to the truth table in FIG. 6A.

Thus, during each cycle (i.e., period) of the clock signal CLK, the outputs Out and $\overline{Out}$ are preset high (i.e., one) in the respective clock low phase, and one of the outputs Out and $\overline{Out}$ goes low (i.e., zero) in the respective clock high phase while the other one of the outputs Out and $\overline{Out}$ stays high (i.e., one). Thus, the output of one of the XOR gate 520 and the XNOR gate 530 switches logic states during the clock high phase. Since the XOR gate 520 and the XNOR gate 530 have similar structures (i.e., both are implemented using the circuit block 410 in FIG. 4), the same number of capacitor nodes are charged/discharged independent of which one of the outputs Out and $\overline{\text{Out}}$ switches logic states. As a result, the power profile of the differential XOR gate 510 is approximately the same regardless of which one of the outputs Out and $\overline{\text{Out}}$ switches logic states during the clock high phase. Accordingly, the power profile of the dynamic differential XOR gate 710 is approximately the same for each clock cycle independent of which one of the outputs Out and $\overline{\text{Out}}$ goes low during the clock cycle. Thus, the power profile is approximately uniform across clock cycles, making it very difficult for an attacker to discern logic bit values based on power measurements.

As shown above, presetting both outputs Out and $\overline{\text{Out}}$ of the differential XOR gate 510 high (i.e., one) results in a more uniform power profile that is resilient to DPA attacks. The same may be accomplished by presetting both outputs Out and $\overline{\text{Out}}$ of the differential XOR gate 510 low (i.e., zero) instead. In this case, one of the outputs Out and $\overline{\text{Out}}$ switches from low to high after both outputs are preset low.

The static differential XOR gate 510 may also be preset by inputting a preset input value to the inputs of the static differential XOR gate 510. For example, both outputs Out and $\overline{\text{Out}}$ of the static differential XOR gate 510 may be preset high (i.e., one) by inputting a preset input value of zero to all of the inputs of the static differential XOR gate 510. In this regard, FIG. 6B shows a first preset table in which a preset input value of zero is input to inputs a, $\bar{\text{a}}$, b and $\bar{\text{b}}$ of the static differential XOR gate 510, causing both outputs Out and $\overline{\text{Out}}$ to preset high (i.e., one). Thus, during preset, the same value (i.e., zero) is input to all of the inputs to preset outputs Out and $\overline{\text{Out}}$ high (i.e., one).

In this example, a logic circuit (not shown in FIG. 5) may be coupled to the inputs of the static differential XOR gate. During a preset phase, the logic circuit inputs a preset input value of zero to inputs a, $\bar{\text{a}}$, b and $\bar{\text{b}}$ of the static differential XOR gate 510 to preset both outputs Out and $\overline{\text{Out}}$ high (i.e., one). During an evaluation phase following the preset phase, the logic circuit inputs a first pair of complementary data bits to inputs a and $\bar{\text{a}}$, and a second pair of complementary data bits to inputs b and $\bar{\text{b}}$. The data bits may include cryptography data or other secure data. In response to the data bits, the static differential XOR gate 510 switches one of the outputs Out and $\overline{\text{Out}}$ from high to low according to the truth table in FIG. 6A. Inputting a preset input value to the inputs of the static differential XOR gate 510 to preset the outputs Out and $\overline{\text{Out}}$ removes the need for the clock transistors 722, 724 and 726 to preset the outputs Out and $\overline{\text{Out}}$. This reduces power consumption by removing the switching power associated with switching the clock transistors 722, 724 and 726. The logic circuit may include one or more dynamic differential logic gates, one or more static differential logic gates or a combination of dynamic and static differential logic gates, examples of which are discussed below with reference to FIG. 14.

In another example, both outputs Out and $\overline{\text{Out}}$ of the static differential XOR gate 510 may be preset low (i.e., zero) by inputting a preset input value of one to all of the inputs of the static differential XOR gate 510. In this regard, FIG. 6C shows a second preset table in which a preset input value of one is input to inputs a, $\bar{\text{a}}$, b and $\bar{\text{b}}$ of the static differential XOR gate 510, causing both outputs Out and $\overline{\text{Out}}$ to preset low (i.e., zero).

In this example, a logic circuit (not shown in FIG. 5) may be coupled to the inputs of the static differential XOR gate. During a preset phase, the logic circuit inputs a preset input value of one to inputs a, $\bar{\text{a}}$, b and $\bar{\text{b}}$ of the static differential XOR gate 510 to preset both outputs Out and $\overline{\text{Out}}$ low (i.e., zero). During an evaluation phase following the preset phase, the logic circuit inputs a first pair of complementary data bits to inputs a and $\bar{\text{a}}$, and a second pair of complementary data bits to inputs b and $\bar{\text{b}}$. The data bits may include cryptography data or other secure data. In response to the data bits, the static differential XOR gate 510 switches one of the outputs Out and $\overline{\text{Out}}$ from low to high according to the truth table in FIG. 6A. The logic circuit may include one or more dynamic differential logic gates, one or more static differential logic gates or a combination of dynamic and static differential logic gates, examples of which are discussed below with reference to FIG. 14.

Figure 8:
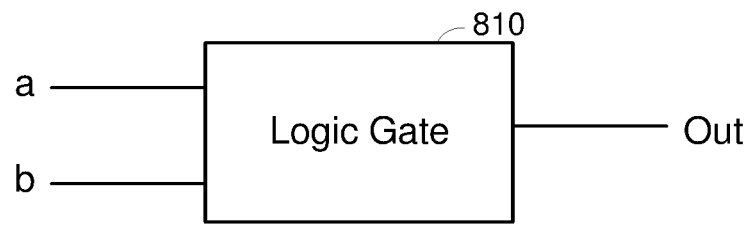
FIG. 8 shows an example of a glitch caused by input data bits arriving at a logic gate at different times.
Figure 8:
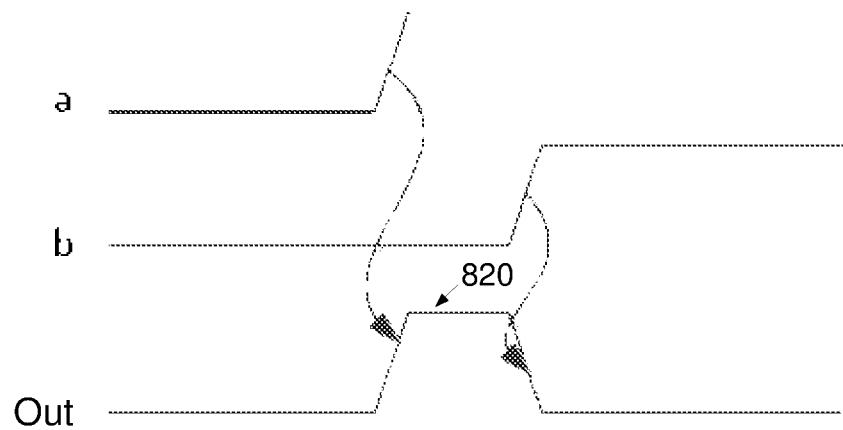

A logic gate may be susceptible to glitches that occur when data bits corresponding to different inputs of the logic gate arrive at the logic gate at different times. In this regard, FIG. 8 shows an example of a glitch for a logic gate 810 that performs an XOR function. In this example, the logic gate 810 has two inputs (labeled "a" and "b"), and an output (labeled "Out"). FIG. 8 shows a timing diagram in which a bit value of one is sent to input a of the logic gate 810, and a bit value of one is sent to input b of the logic gate 810. In this example, the bit value of one for input a arrives at the logic gate 810 before the bit value of one for input b. This causes the output Out of the logic gate 810 to temporarily go high between the time the bit value of one for input a arrives at the logic gate 810 and the time the bit value of one for input b arrives at the logic gate 810, resulting in a glitch 820.

Figure 9A:
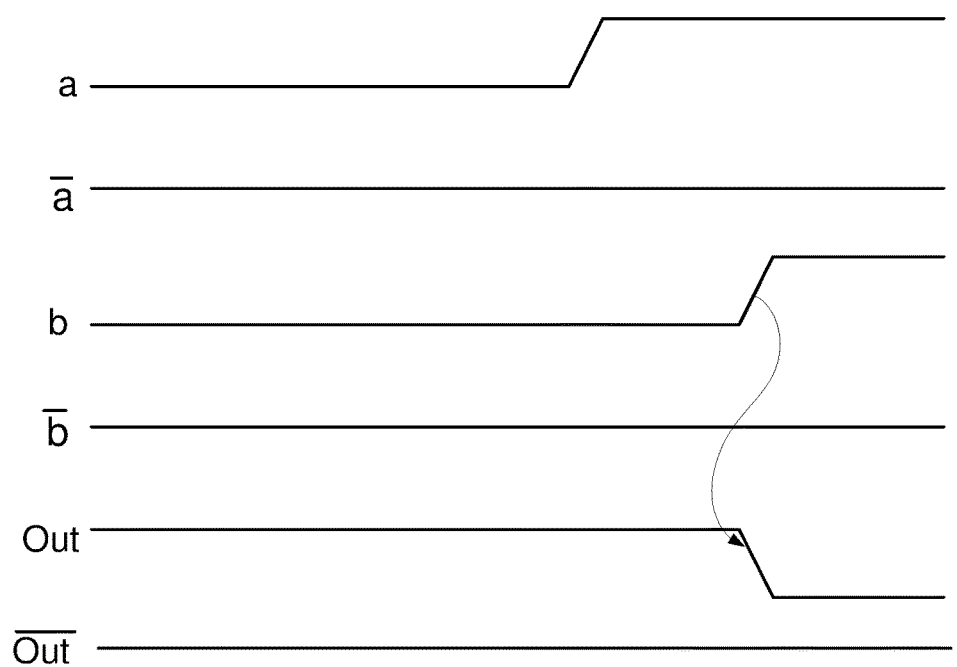
FIG. 9A shows a timing diagram of an example of data bits arriving at the static differential XOR gate at different times according to certain aspects of the present disclosure.

Presetting the static differential XOR gate 510 substantially reduce glitches that occur when data bits arrive at the inputs of the static differential XOR gate 510 at different times. In this regard, FIG. 9A shows an example of a timing diagram in which a preset input value of zero is initially input to the inputs a, $\bar{\text{a}}$, b and $\bar{\text{b}}$ of the static differential XOR gate 510, which presets the outputs Out and $\overline{\text{Out}}$ high (i.e., one). In this example, a bit value of one is sent to input a and a bit value of one is sent to input b. Note that input $\bar{\text{a}}$ stays at zero since the bit value for input $\bar{\text{a}}$ is the complement of the bit value for input a, and input $\bar{\text{b}}$ stays at zero since the bit value for input $\bar{\text{b}}$ is the complement of the bit value for input b.

In this example, the bit value of one for input a arrives before the bit value of one for input b. When the bit value of one for input a first arrives at input a, both outputs Out and $\overline{\text{Out}}$ remain high (i.e., remain at the preset output value of one), as shown in FIG. 9A. This is because both inputs b and $\bar{\text{b}}$ are still at the preset input value of zero, which keeps both outputs Out and $\overline{\text{Out}}$ high (i.e., at the preset output value of one). This can be demonstrated with reference to FIG. 5. When both inputs b and $\bar{\text{b}}$ are at the preset input value of zero, the second PFET 414(1) and the third PFET 422(1) in the XOR gate 510 are both turned on. As a result, a conduction path between the output node 430(1) and the supply rail Vdd is maintained through the third and fourth PFETs 422(1) and 424(1). This keeps the true output Out high (i.e., at the preset output value of one). A similar analysis can be performed on the XNOR gate 530 to show that the complement output $\overline{\text{Out}}$ also stays high (i.e., at the preset output value of one).

When the bit value of one for input b arrives at input b, the true output Out of the static differential logic gate 510 switches from high to low in accordance with the truth table in FIG. 6A. Thus, the true output Out only switches logic states once during the evaluation phase (i.e., at the arrival of the bit value of one for input b), thereby avoiding a glitch. Note that, in this example, the complement output $\overline{\text{Out}}$ stays high (i.e., does not switch logic states).

Figure 9B:
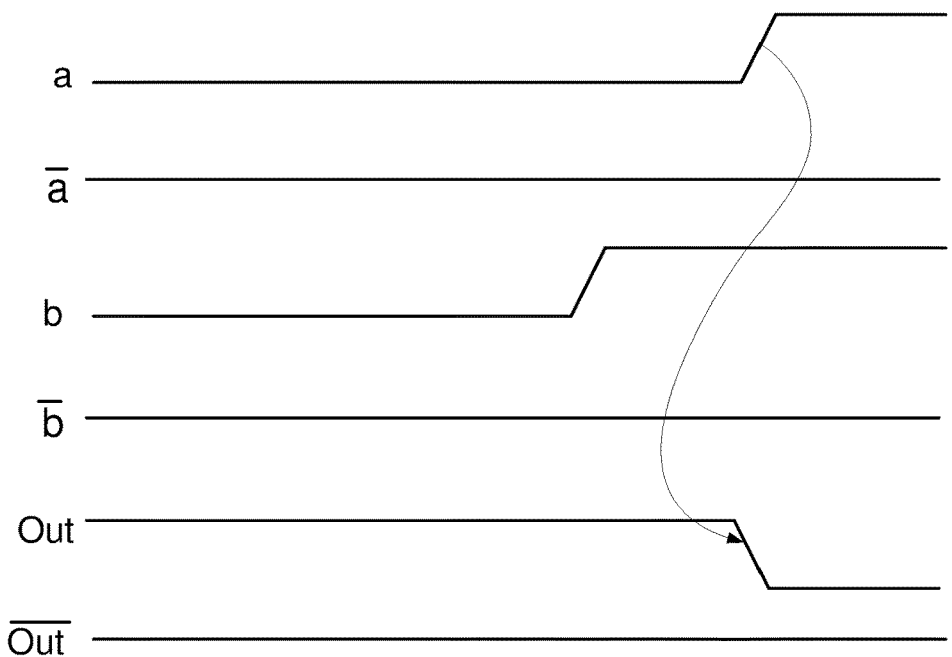
FIG. 9B shows a timing diagram of another example of data bits arriving at the static differential XOR gate at different times according to certain aspects of the present disclosure.

FIG. 9B shows an example in which the bit value of one for input b arrives before the bit value of one for input a. When the bit value of one for input b first arrives at input b, both outputs Out and $\overline{\text{Out}}$ remain high (i.e., remain at the preset output value of one), as shown in FIG. 9B. This is because both inputs a and $\overline{\text{a}}$ are still at the preset input value of zero, which keeps the both outputs Out and $\overline{\text{Out}}$ high (i.e., at the preset output value of one). This can be demonstrated with reference to FIG. 5. When both inputs a and $\overline{\text{a}}$ are at the preset input value of zero, the first PFET 412(1) and the fourth PFET 424(1) in the XOR gate 510 are both turned on. As a result, a conduction path between the output node 430(1) and the supply rail Vdd is maintained through the first and second PFETs 412(1) and 414(1). This keeps the true output Out high (i.e., at the preset output value of one). A similar analysis can be performed on the XNOR gate 530 to show that the complement output $\overline{\text{Out}}$ also stays high (i.e., at the preset output value of one).

When the bit value of one for input a arrives at input a, the true output Out of the static differential logic gate 510 switches from high to low in accordance with the truth table in FIG. 6A. Thus, the true output Out only switches logic states once during the evaluation phase (i.e., at the arrival of the bit value of one for input a), thereby avoiding a glitch.

The analysis discussed above with reference to FIGS. 9A and 9B may be performed for other combinations of data bit values to show that presetting the static differential XOR gate 510 substantially reduces glitches for the other combinations of data bit values. In general, presetting the static differential XOR gate 510 during a preset phase helps ensure that none of the outputs changes logic states more than once during the following evaluation phase, thereby avoiding a glitch.

Figure 10:
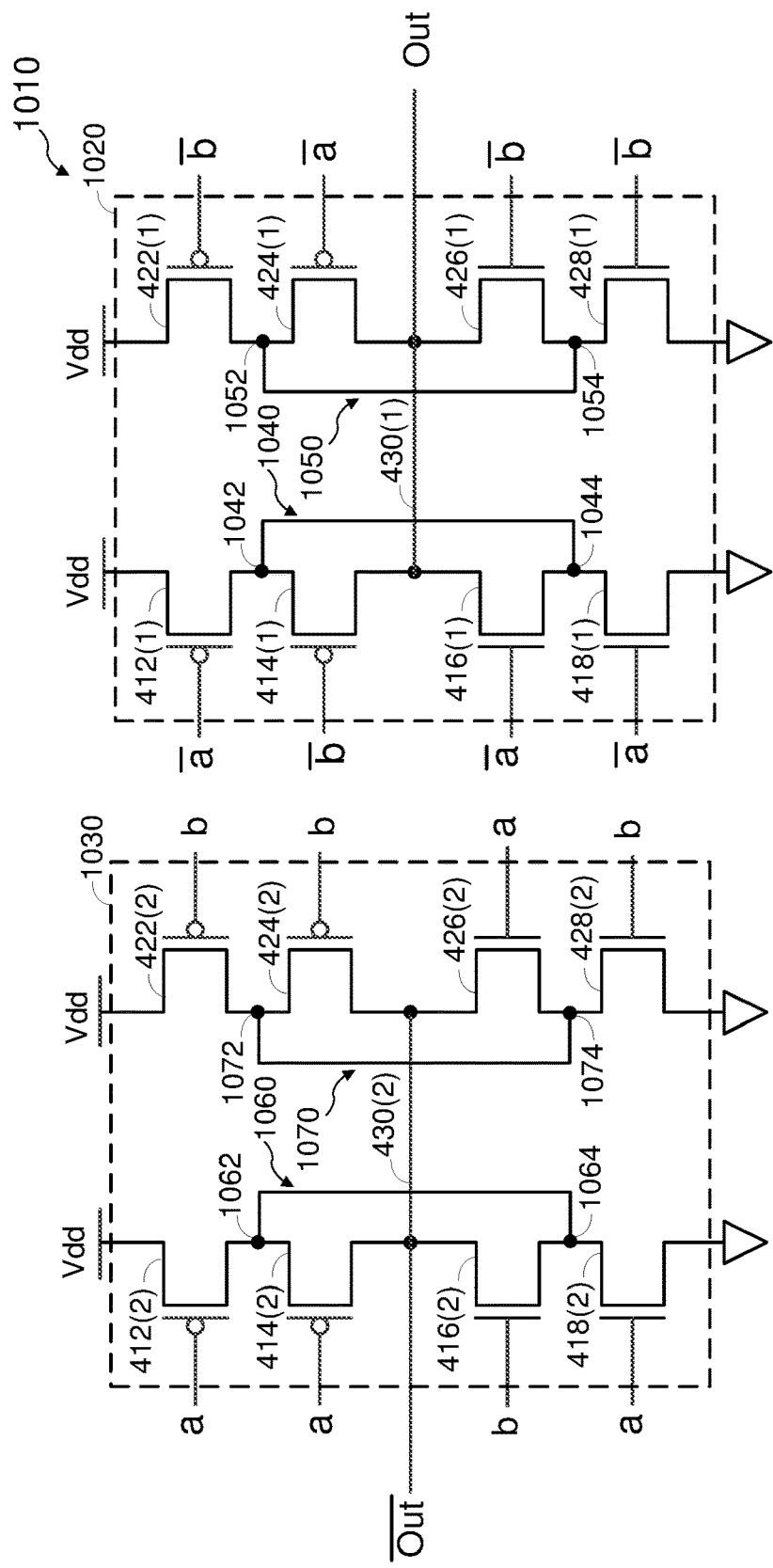
FIG. 10 shows an example of a static differential AND gate according to certain aspects of the present disclosure.

FIG. 10 shows an example of a static differential AND gate 1010 that is implemented based on the circuit block 410 shown in FIG. 4 according to certain aspects of the present disclosure. In this example, the static differential AND gate 1010 includes inputs a, $\overline{\text{a}}$, b and $\overline{\text{b}}$. As discussed further below, inputs a and $\overline{\text{a}}$ are configured to receive a first pair of complementary data bits, and inputs b and $\overline{\text{b}}$ are configured to receive a second pair of complementary data bits. Each of the inputs may be implemented with a metal structure that is coupled to the gates of a respective subset of the transistors in the static differential AND gate.

The static differential AND gate 1010 is configured to perform a differential AND operation on the first and second pairs of complementary data bits to generate a pair of complementary output data bits, which is output from outputs Out and $\overline{\text{Out}}$. In the discussion below, output Out is referred to as the true output and output $\overline{\text{Out}}$ is referred to as the complement output.

The static differential AND gate 1010 includes a single-output AND gate 1020 and a single-output NAND gate 1030. The single-output AND gate 1020 provides the true output Out of the differential AND gate 1010, and the single-output NAND gate 1030 provides the complement output $\overline{\text{Out}}$ of the differential AND gate 1010. Each of the AND gate 1020 and the NAND gate 1030 is implemented with a separate instance (i.e., copy) of the circuit block 410. The reference number for each transistor in the AND gate 1020 includes a one in parenthesis and the reference number for each transistor in the NAND gate 1030 includes a two in parenthesis in order to distinguish between the two separate instances (i.e., copies) of the circuit block 410.

In the example shown in FIG. 10, the AND gate 1020 is implemented by coupling input a to the gates of the first PFET 412(1), the first NFET 416(1), the second NFET 418(1) and the fourth PFET 424(1), and coupling input $\overline{\text{b}}$ to the gates of the second PFET 414(1), the third PFET 422(1), the third NFET 426(1), and the fourth NFET 428(1). The output node 430(1) provides the true output Out of the differential AND gate 1010.

The NAND gate 1030 is implemented by coupling input a to the gates of the first PFET 412(2), the second PFET 414(2), the second NFET 418(2), and the third NFET 426(2), and coupling input b to the gates of the first NFET 416(2), the third PFET 422(2), the fourth PFET 424(2), and the fourth NFET 428(2). The output node 430(2) provides the complement output $\overline{\text{Out}}$ of the differential AND gate 1010.

FIG. 11A shows a truth table for the differential AND gate 1010, in which inputs a and $\overline{\text{a}}$ have complementary logic values, and inputs b and $\overline{\text{b}}$ have complementary logic values. As can be seen from the truth table, the outputs Out and $\overline{\text{Out}}$ have complementary logic values. The true output Out is one when both inputs a and b are one, and is zero when one or both inputs a and b are zero.

The static differential AND gate 1010 may be preset by inputting a preset input value to the inputs of the static differential AND gate 1010. For example, both outputs Out and $\overline{\text{Out}}$ of the static differential AND gate 1010 may be preset high (i.e., one) by inputting a preset input value of zero to all of the inputs of the static differential AND gate 1010. In this regard, FIG. 11B shows a first preset table in which a preset input value of zero is input to inputs a, $\overline{\text{a}}$, b and $\overline{\text{b}}$ of the static differential AND gate 1010, causing both outputs Out and $\overline{\text{Out}}$ to preset high (i.e., one).

In this example, a logic circuit (not shown in FIG. 10) may be coupled to the inputs of the static differential AND gate. During a preset phase, the logic circuit inputs a preset input value of zero to inputs a, $\overline{\text{a}}$, b and $\overline{\text{b}}$ of the static differential AND gate 1010 to preset both outputs Out and $\overline{\text{Out}}$ high (i.e., one). During an evaluation phase following the preset phase, the logic circuit inputs a first pair of complementary data bits to inputs a and $\overline{\text{a}}$, and a second pair of complementary data bits to inputs b and $\overline{\text{b}}$. The data bits may include cryptography data or other secure data. In response to the data bits, the static differential AND gate 1010 switches one of the Out and $\overline{\text{Out}}$ from high to low according to the truth table in FIG. 11A. The logic circuit may include one or more dynamic differential logic gates, one or more static differential logic gates or a combination of dynamic and static differential logic gates, examples of which are discussed below with reference to FIG. 14.

In another example, both outputs Out and $\overline{\text{Out}}$ of the static differential AND gate 1010 may be preset low (i.e., zero) by inputting a preset input value of one to all of the inputs of the static differential AND gate 1010. In this regard, FIG. 11C shows a second preset table in which a preset input value of one is input to inputs a, $\overline{\text{a}}$, b and $\overline{\text{b}}$ of the static differential AND gate 1010, causing both outputs Out and $\overline{\text{Out}}$ to preset low (i.e., zero).

In this example, a logic circuit (not shown in FIG. 10) may be coupled to the inputs of the static differential AND gate. During a preset phase, the logic circuit inputs a preset input value of one to inputs a, $\overline{\text{a}}$, b and $\overline{\text{b}}$ of the static differential AND gate 510 to preset both outputs Out and $\overline{\text{Out}}$ low (i.e., zero). During an evaluation phase following the preset phase, the logic circuit inputs a first pair of complementary data bits to inputs a and $\overline{\text{a}}$, and a second pair of complementary data bits to inputs b and $\overline{\text{b}}$. The data bits may include cryptography data or other secure data. In response to the data bits, the static differential AND gate 1010 switches one of the Out and $\overline{\text{Out}}$ from low to high according to the truth table in FIG. 11A. The logic circuit may include one or more dynamic differential logic gates, one or more static differential logic gates or a combination of dynamic and static differential logic gates, examples of which are discussed below with reference to FIG. 14.

In the above examples, presetting the outputs Out and $\overline{\text{Out}}$ during the preset phase ensures that one of the outputs Out and $\overline{\text{Out}}$ switches logic states during the evaluation phase. Thus, the output of one of the AND gate 1020 and the NAND gate 1030 switches logic states during the evaluation phase. Since the AND gate 1020 and the NAND gate 1030 have similar structures (i.e., both are implemented using the circuit block 410 in FIG. 4), the same number of capacitor nodes are charged/discharged independent of which one of the outputs Out and $\overline{\text{Out}}$ switches logic states. As a result, the power profile of the differential AND gate 1010 is approximately the same regardless of which one of the outputs Out and $\overline{\text{Out}}$ switches logic states during the evaluation phase. Thus, the power profile is approximately uniform, making it very difficult for an attacker to discern logic bit values based on power measurements.

In the example shown in FIG. 10, the AND gate 1020 includes a first conduction path 1040 between a first internal node 1042 and a second internal node 1044. The first internal node 1042 is between the drain of the first PFET 412(1) and the source of the second PFET 414(1), and the second internal node 1044 is between the source of the first NFET 416(1) and the drain of the second NFET 418(1). The AND gate 1020 also includes a second conduction path 1050 between a third internal node 1052 and a fourth internal node 1054. The third internal node 1052 is between the drain of the third PFET 422(1) and the source of the fourth PFET 424(2), and the fourth internal node 1054 is between the source of the third NFET 426(1) and the drain of the fourth NFET 428(1).

The first and second conduction paths 1040 and 1050 are used set the capacitances at internal nodes 1042, 1044, 1052 and 1054 to known charge states during preset of the AND gate 1020. For example, if a preset input value of one is input to all of the inputs of the AND gate 1020 to preset output Out to zero, then the capacitances at nodes 1042, 1044, 1052 and 1054 are discharged to ground. In this case, the capacitance at internal node 1042 is discharged to ground through the first conduction path 1040 and the second NFET 418(1), and the capacitance at node 1044 is discharged to ground through the second NFET 418(1). Also, the capacitance at internal node 1052 is discharged to ground through the second conduction path 1050 and the fourth NFET 428(1), and the capacitance at node 1054 is discharged to ground through the fourth NFET 428(1). Setting the capacitances at internal nodes 1042, 1044, 1052 and 1054 to known charge states during each preset reduces the dependency of the power profile on the data bit values, resulting in a more uniform power profile.

Similar to the AND gate 1020, the NAND gate 1030 includes a first conduction path 1060 between a first internal node 1062 and a second internal node 1064. The first internal node 1062 is between the drain of the first PFET 412(2) and the source of the second PFET 414(2), and the second internal node 1064 is between the source of the first NFET 416(2) and the drain of the second NFET 418(2). The NAND gate 1030 also includes a second conduction path 1070 between a third internal node 1072 and a fourth internal node 1074. The third internal node 1072 is between the drain of the third PFET 422(2) and the source of the fourth PFET 424(2), and the fourth internal node 1074 is between the source of the third NFET 426(2) and the drain of the fourth NFET 428(2). Similar to the AND gate 1020, the first and second conduction paths 1060 and 1070 are used set the capacitances at internal nodes 1062, 1064, 1072 and 1074 to known charge states during preset of the NAND gate 1030.

The static differential AND gate 1010 may be used to implement a dynamic differential AND gate. This may be done, for example, by coupling a first clock PFET between the true output Out and the supply rail, coupling a second clock PFET between the complement output $\overline{\text{Out}}$ and the supply rail, and coupling a clock NFET between the static differential AND gate 1010 and ground. In this example, the gates of the clock transistors are driven by a clock signal.

Figure 12:
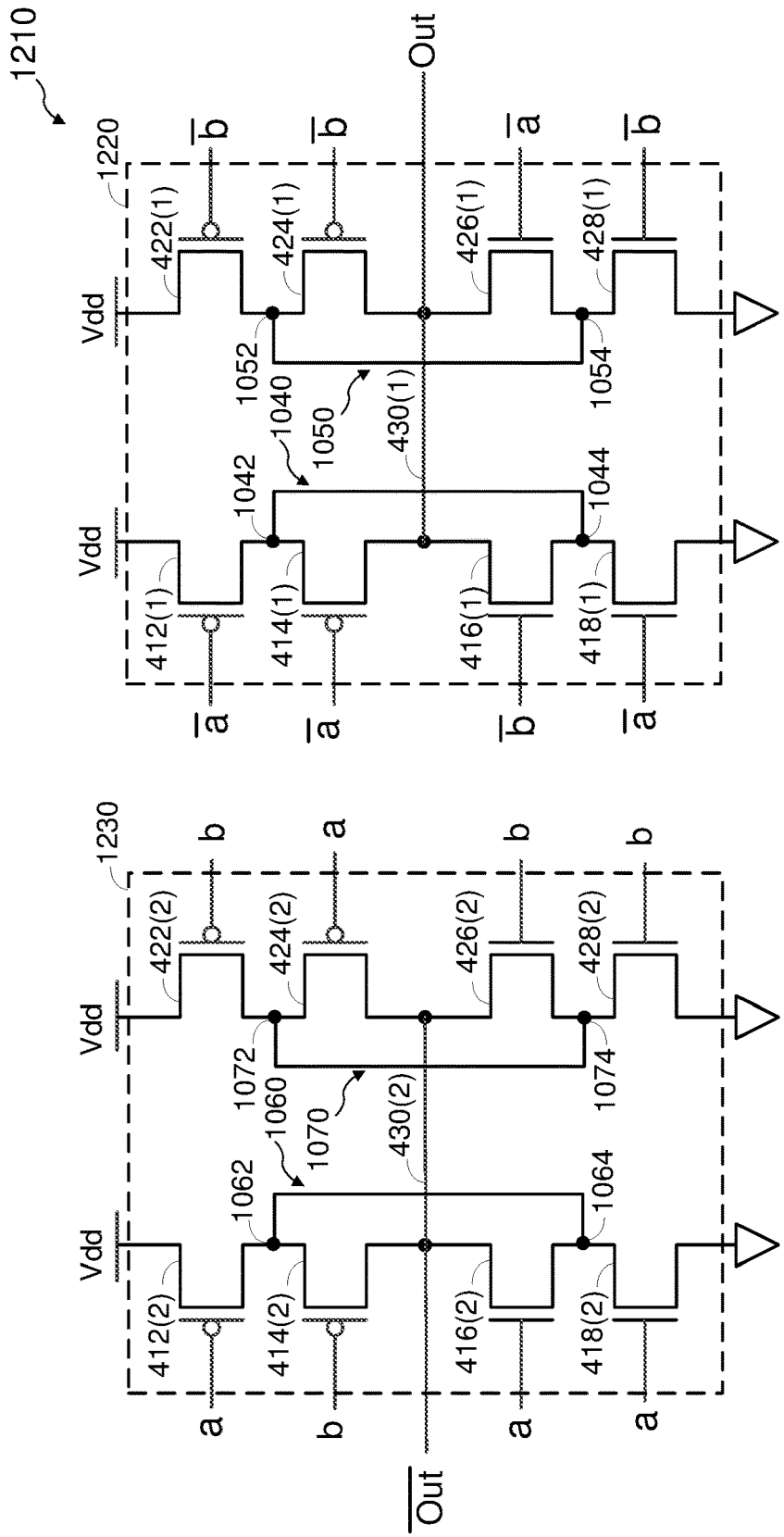
FIG. 12 shows an example of a static differential OR gate according to certain aspects of the present disclosure.

FIG. 12 shows an example of a static differential OR gate 1210 that is implemented based on the circuit block 410 shown in FIG. 4 according to certain aspects of the present disclosure. The static differential OR gate 1210 has a similar structure as the static differential AND gate 1010, in which the inputs are rearranged to perform a differential OR operation. Components that are common to the differential AND gate 1010 and the differential OR gate 1210 are identified by the same reference numbers.

In this example, the static differential OR gate 1210 includes inputs a, $\overline{\text{a}}$, b and $\overline{\text{b}}$. As discussed further below, inputs a and $\overline{\text{a}}$ are configured to receive a first pair of complementary data bits, and inputs b and $\overline{\text{b}}$ are configured to receive a second pair of complementary data bits. Each of the inputs may be implemented as a metal structure that coupled is to the gates of a respective subset of the transistors in the static differential OR gate.

The static differential OR gate 1210 is configured to perform a differential OR operation on the first and second pairs of complementary data bits to generate a pair of complementary output data bits, which is output from outputs Out and $\overline{\text{Out}}$. In the discussion below, output Out is referred to as the true output and output Out is referred to as the complement output.

The static differential OR gate 1210 includes a single-output OR gate 1220 and a single-output NOR gate 1230. The single-output OR gate 1220 provides the true output Out of the differential OR gate 1210, and the single-output NOR gate 1230 provides the complement output $\overline{\text{Out}}$ of the differential OR gate 1210. Each of the OR gate 1020 and the NOR gate 1230 is implemented with a separate instance (i.e., copy) of the circuit block 410. The reference number for each transistor in the OR gate 1220 includes a one in parenthesis and the reference number for each transistor in the NOR gate 1230 includes a two in parenthesis in order to distinguish between the two separate instances (i.e., copies) of the circuit block 410.

In the example shown in FIG. 12, the OR gate 1220 is implemented by coupling input a to the gates of the first PFET 412(1), the second PFET 414(1), the second NFET 418(1), and the third NFET 426(1), and coupling input b to the gates of the third PFET 422(1), the fourth PFET 424(1), the first NFET 416(1), and the fourth NFET 428(1). The output node 430(1) provides the true output Out of the differential OR gate 1210.

The NOR gate 1230 is implemented by coupling input a to the gates of the first PFET 412(2), the first NFET 416(2), the second NFET 418(2), and the fourth PFET 424(2), and coupling input b to the gates of the second PFET 414(2), the third PFET 422(2), the third NFET 426(2), and the fourth NFET 428(2). The output node 430(2) provides the complement output $\overline{\text{Out}}$ of the differential OR gate 1210.

FIG. 13A shows a truth table for the differential OR gate 1210, in which inputs a and $\overline{\text{a}}$ have complementary logic values, and inputs b and b̄ have complementary logic values. As can be seen from the truth table, the outputs Out and Out̄ have complementary logic values. The true output Out is one when one or both inputs a and b are one, and is zero when both inputs a and b are zero.

The static differential OR gate 1210 may be preset by inputting a preset input value to the inputs of the static differential OR gate 1210. For example, both outputs Out and Out̄ of the static differential OR gate 1210 may be preset high (i.e., one) by inputting a preset input value of zero to all of the inputs of the static differential OR gate 1210. In this regard, FIG. 13B shows a first preset table in which a preset input value of zero is input to inputs a, ā, b and b̄ of the static differential OR gate 1210, causing both outputs Out and Out̄ to preset high (i.e., one).

In this example, a logic circuit (not shown in FIG. 12) may be coupled to the inputs of the static differential OR gate. During a preset phase, the logic circuit inputs a preset input value of zero to inputs a, ā, b and b̄ of the static differential OR gate 1210 to preset both outputs Out and Out̄ high (i.e., one). During an evaluation phase following the preset phase, the logic circuit inputs a first pair of complementary data bits to inputs a and ā, and a second pair of complementary data bits to inputs b and b̄. The data bits may include cryptography data or other secure data. In response to the data bits, the static differential OR gate 1210 switches one of the Out and Out̄ from high to low according to the truth table in FIG. 13A. The logic circuit may include one or more dynamic differential logic gates, one or more static differential logic gates or a combination of dynamic and static differential logic gates, examples of which are discussed below with reference to FIG. 14.

In another example, both outputs Out and Out̄ of the static differential OR gate 1210 may be preset low (i.e., zero) by inputting a preset input value of one to all of the inputs of the static differential OR gate 1210. In this regard, FIG. 13C shows a second preset table in which a preset input value of one is input to inputs a, ā, b and b̄ of the static differential OR gate 1210, causing both outputs Out and Out̄ to preset low (i.e., zero).

In this example, a logic circuit (not shown in FIG. 12) may be coupled to the inputs of the static differential OR gate. During a preset phase, the logic circuit inputs a preset input value of one to inputs a, ā, b and b̄ of the static differential OR gate 1210 to preset both outputs Out and Out̄ low (i.e., zero). During an evaluation phase following the preset phase, the logic circuit inputs a first pair of complementary data bits to inputs a and ā, and a second pair of complementary data bits to inputs b and b̄. The data bits may include cryptography data or other secure data. In response to the data bits, the static differential OR gate 1210 switches one of the Out and Out̄ from low to high according to the truth table in FIG. 13A. The logic circuit may include one or more dynamic differential logic gates, one or more static differential logic gates or a combination of dynamic and static differential logic gates, examples of which are discussed below with reference to FIG. 14.

In the above examples, presetting the outputs Out and Out̄ during the preset phase ensures that one of the outputs Out and Out̄ switches logic states during the evaluation phase. Thus, the output of one of the OR gate 1220 and the NOR gate 1230 switches logic states during the evaluation phase. Since the OR gate 1220 and the NOR gate 1230 have similar structures (i.e., both are implemented using the circuit block 410 in FIG. 4), the same number of capacitor nodes are charged/discharged independent of which one of the outputs Out and Out̄ switches logic states. As a result, the power profile of the differential OR gate 1210 is approximately the same regardless of which one of the outputs Out and Out̄ switches logic states during the evaluation phase. Thus, the power profile is approximately uniform, making it very difficult for an attacker to discern logic bit values based on power measurements.

As shown in FIG. 12, the OR gate 1220 includes the first conduction path 1040 and the second conduction path 1050 discussed above, and the NOR gate 1230 includes the first conduction path 1060 and the second conduction paths 1070 discussed above. For brevity, the description of these conduction paths is not repeated here.

The static differential OR gate 1210 may be used to implement a dynamic differential OR gate. This may be done, for example, by coupling a first clock PFET between the true output Out and the supply rail, coupling a second clock PFET between the complement output Out̄ and the supply rail, and coupling a clock NFET between the static differential OR gate 1210 and ground. In this example, the gates of the clock transistors are driven by a clock signal.

Figure 14:
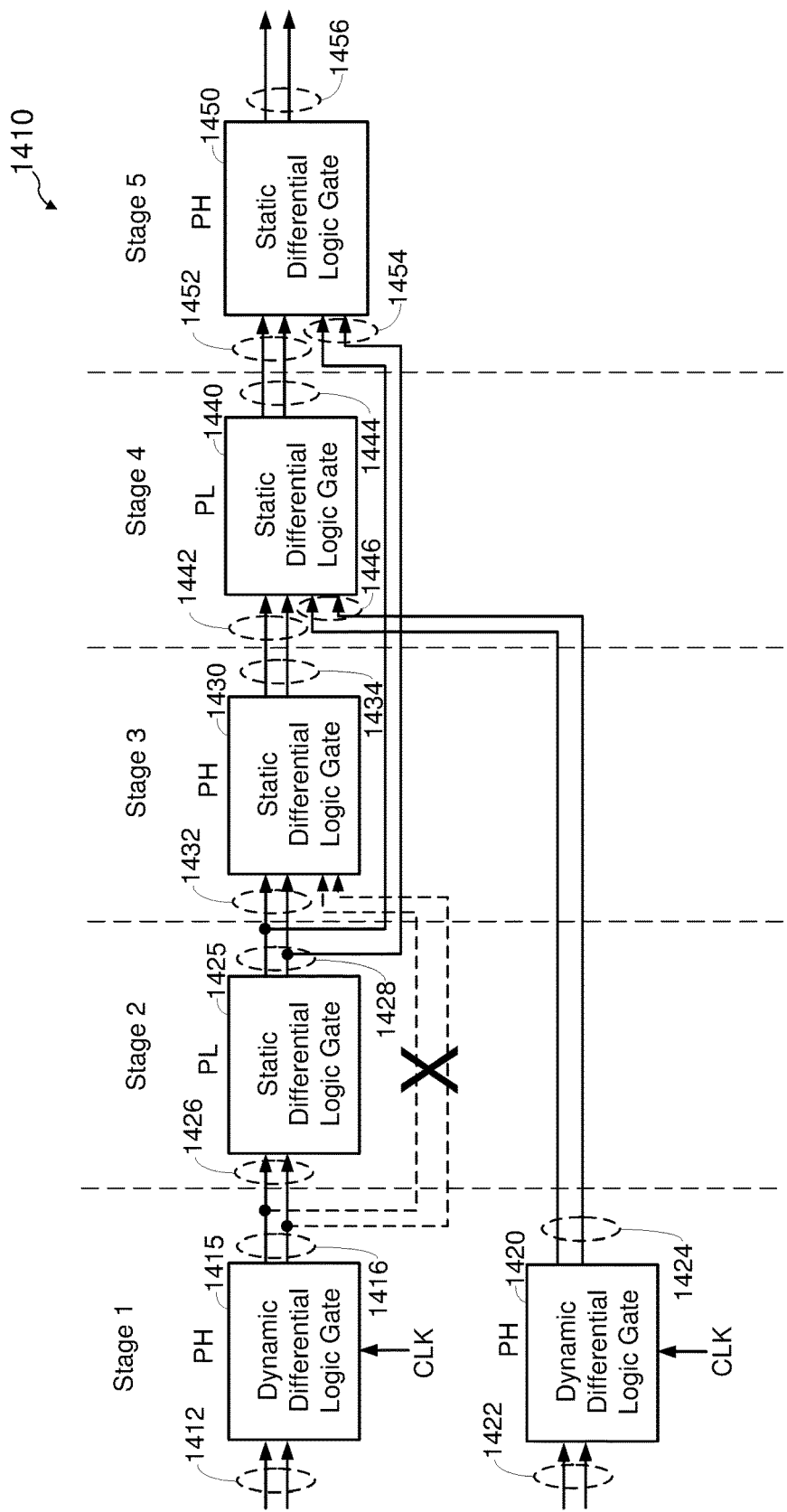
FIG. 14 shows an example of a pipeline including multiple differential logic gates according to certain aspects of the present disclosure.

The exemplary differential logic gates discussed above may be cascaded to implement a pipeline that is resilient to DPA attacks. In this regard, FIG. 14 shows an exemplary pipeline 1410 having multiple stages (labeled "Stage 1" to "Stage 5"), in which each stage includes one or more differential logic gates 1415, 1420, 1425, 1430, 1440 and 1450.

The first stage (labeled "Stage 1") of the pipeline 1410 includes first and second dynamic differential logic gates 1415 and 1420. Each of the dynamic differential logic gates may be implemented with the dynamic differential logic gate 310 shown in FIG. 3 or the dynamic differential XOR logic gate 710 shown in FIG. 7. Each of the subsequent stages (labeled "Stage 2" to "Stage 5") of the pipeline 1410 includes one or more static differential logic gates 1425, 1430, 1440 and 1450. Each of the static differential logic gates may be implemented with the static differential XOR gate 510 shown in FIG. 5, the static differential AND gate 1010 shown in FIG. 10, or the static differential OR gate 1210 shown in FIG. 12. Thus, in this example, the first stage of the pipeline 1410 includes dynamic differential logic gates 1415 and 1420 and the subsequent stages of the pipeline 1410 include static differential logic gates 1425, 1430, 1440 and 1450.

As discussed further below, the dynamic differential logic gates 1415 and 1420 in the first stage of the pipeline 1410 are used to preset the static differential logic gates 1425, 1430, 1435 and 1440 in the subsequent stages of the pipeline 1410 without the need for dynamic differential logic gates in the subsequent stages. Using static differential logic gates in the subsequent stages reduces the power of the pipeline 1410. This is because the static differential logic gates do not consume switching power for switching clock transistors.

In this example, each static differential logic gate is configured to preset its outputs to a respective preset output value (i.e., a one or a zero) when a respective preset input value is input to the inputs of the static differential logic gate. Also, each static differential logic gate is configured to preset its outputs to a preset output value that is the opposite of the preset input value input to the static differential logic gate. For example, if a preset input value of one (i.e., high) is input to a static differential logic gate, then the static differential logic gate presets its outputs to a preset output value of zero (i.e., low), and vice versa.

The first and second dynamic differential logic gates 1415 and 1420 receive a clock signal CLK, which drives the clock transistors (not shown in FIG. 14) in the first and second dynamic differential logic gates 1415 and 1420. Each cycle (i.e., period) of the clock signal CLK includes a preset phase and an evaluation phase. In one example, the preset phase occurs when the clock signal CLK is low, and the evaluation phase occurs when the clock signal CLK is high. In this example, the preset phase corresponds to the clock low phase discussed above, and the evaluation phase corresponds to the clock high phase discussed above.

During each preset phase, the first and second dynamic differential logic gates 1415 and 1420 preset their outputs 1416 and 1424 high (i.e., one). In the example shown in FIG. 14, the outputs 1416 of the first dynamic differential logic gate 1415 are coupled to inputs 1426 of the static differential logic gate 1425 in the second stage (labeled "Stage 2"). Thus, during each preset phase, the first dynamic differential logic gate 1415 outputs a preset value of one to the static differential logic gate 1425 in the second stage, which causes the static differential logic gate 1425 in the second stage to preset its outputs 1428 low (i.e., zero). This is because the static differential logic gate 1425 presets its outputs 1428 to a preset value that is the opposite of the preset value input to the static differential logic gate 1425.

The static differential logic gate 1425 in the second stage outputs the preset value of zero to inputs 1432 of the static differential logic gate 1430 in the third stage (labeled "Stage 3"), which causes the static differential logic gate 1430 in the third stage to preset its outputs 1434 high (i.e., one). The static differential logic gate 1430 in the third stage outputs the preset value of one to inputs 1442 of the static differential logic gate 1440 in the fourth stage (labeled "Stage 4"), which causes the static differential logic gate 1440 in the fourth stage to preset its outputs 1444 low (i.e., zero). Finally, the static differential logic gate 1440 in the fourth stage outputs the preset value of zero to inputs 1452 of the static differential logic gate 1450 in the fifth stage (labeled "Stage 5"), which causes the static differential logic gate 1450 in the fifth stage to preset its outputs 1465 high (i.e., one).

Thus, during each preset phase, the preset value at the outputs 1416 of the first dynamic differential logic gate 1415 causes the static differential logic gates 1425, 1430, 1440 and 1450 in the subsequent stages of the pipeline 1410 to preset their outputs. The preset output values of the static differential logic gates 1425, 1430, 1440 and 1450 alternative between low and high in moving from the second stage to the fifth stage. In FIG. 14, the label "PH" indicates that the corresponding differential logic gate has a high preset output value, and the label "PL" indicates that the corresponding differential logic gate has a low preset output value.

During each evaluation phase, the first dynamic differential logic gate 1415 receive one or more pairs of complementary input data bits at its inputs 1412, and performs a differential logic operation (e.g., differential XOR operation) on the one or more pairs of complementary input data bits to generate complementary output data bits. The data bits may include cryptography data or other secure data.

The dynamic differential logic gate 1415 outputs the complementary output data bits to the static differential logic gate 1425 in the second stage. The static differential logic gate 1425 in the second stage performs a differential logic operation on the complementary data bits from the first dynamic differential logic gate 1415 to generate complementary output data bits, and outputs the complementary output data bits to the static differential logic gate 1430 in the third stage. This process continues through the subsequent stages of the pipeline, in which each of the static differential logic gates 1430, 1440 and 1450 receives complementary data bits from one or more differential logic gates in a previous stage, performs a differential logic operation on the received data bits to generate complementary output data bits, and outputs the complementary output data bits to one or more differential logic gates in a subsequent stage. The static differential logic gate 1450 if the fifth stage may output its complementary output bits out of the pipeline 1410.

Thus, during each evaluation phase, the pipeline 1410 receives input data bits and performs operations (e.g., encryption or decryption operations) on the input data bits, in which each of the differential logic gates 1415, 1420, 1425, 1430, 1440 and 1450 in the pipeline 1410 performs a subset of the operations. Presetting the differential logic gates 1415, 1420, 1425, 1430, 1440 and 1450 during the preceding preset phase helps ensure monotonic signal propagation through the pipeline 1410 during the evaluation phase, which prevents glitches. In addition, presetting the differential logic gates makes the power profile of the differential logic gates more uniform (i.e., level), making it very difficult for an attacker to discern data bit values inside the pipeline 1410 using power measurements.

FIG. 14 shows an example of additional connections that may be made in the pipeline 1410. More particularly, FIG. 14 shows an example in which the outputs 1424 of the second dynamic differential logic gate 1420 are coupled to inputs 1446 of the static differential logic gate 1440 in the fourth stage. In this example, during each preset phase, the static differential logic gate 1440 receives a preset value of one from the static differential logic gate 1430 in the third stage and a preset value of one from the second dynamic differential logic gate 1420. Thus, during each preset phase, the static differential logic gate 1440 in the fourth stage receives the same preset value of one at all of the inputs 1442 and 1446, causing the static differential logic gate 1440 to preset the outputs 1444 low (i.e., zero). During each evaluation phase, the static differential logic gate 1440 receives complementary data bits from the static differential logic gate 1430 in the third stage and complementary data bits from the second dynamic differential logic gate 1420. The static differential logic gate 1440 performs a differential logic operation (e.g., differential XOR operation) on the received data bits to generate complementary output data bits, and outputs the complementary output bits at the outputs 1444.

FIG. 14 also shows an example in which the outputs 1428 of the static differential logic gate 1425 in the second stage are coupled to inputs 1454 of the static differential logic gate 1450 in the fifth stage. In this example, during each preset phase, the static differential logic gate 1450 receives a preset value of zero from the static differential logic gate 1440 in the fourth stage and a preset value of zero from the static differential logic gate 1425 in the second stage. Thus, during each preset phase, the static differential logic gate 1450 receives the same preset value of zero at all of the inputs 1452 and 1454, causing the static differential logic gate 1450 to preset the outputs 1456 high (i.e., one). During each evaluation phase, the static differential logic gate 1450 receives complementary data bits from the static differential logic gate 1440 in the fourth stage and complementary data bits from the static differential logic gate 1425 in the second stage. The static differential logic gate 1450 performs a differential logic operation (e.g., differential XOR operation) on the received data bits to generate complementary output data bits, and outputs the complementary output bits at the outputs 1456.

As a general rule, the inputs of a static differential logic gate should receive the same preset value during a preset phase in order for the static differential logic gate to properly preset its outputs. In this regard, FIG. 14 shows an example of a connection (shown in dashed lines) that violates this rule, and is therefore not allowed in the pipeline 1410. The connection connects the outputs of the first dynamic differential logic gate 1415 to the static differential logic gate 1430 in the third stage. The connection violates the above rule because, during a preset phase, the first dynamic differential logic gate 1415 outputs a different preset value than the static differential logic gate 1425 in the second stage output (i.e., the dynamic differential logic gate 1415 outputs a preset value of one and the static differential logic gate 1425 in the second stage outputs a preset value of zero). As a result, if the connection (shown in dashed lines) were made, the static differential logic gate 1430 in the third stage would receive different preset values from the first dynamic differential logic gate 1415 and the static differential logic gate 1425 in the second stage. In FIG. 14, the large "X" on the connection indicates that the connection is not allowed. Note that the other exemplary connections shown in FIG. 14 comply with the above rule.

It is to be appreciated that the pipeline 1410 may include a different number of stages than shown in FIG. 14. The logical operations performed by the differential logic gates in the pipeline 1410 and the connections between the differential logic gates in the pipeline 1410 may be chosen to perform desired operations (e.g., cryptography operations). In certain aspects, the connections between the differential logic gates comply with the rule requiring that a static differential logic gates receive the same preset value at all of its inputs during a preset phase.

Although two dynamic differential logic gates 1425 and 1420 are shown in the first stage in the example in FIG. 14, it is to be appreciated that the first stage may include a larger number of dynamic differential logic gates. Further, it is to be appreciated that each dynamic differential logic gate may receive one or more pairs of complementary data bits per clock cycle.

Figure 15:
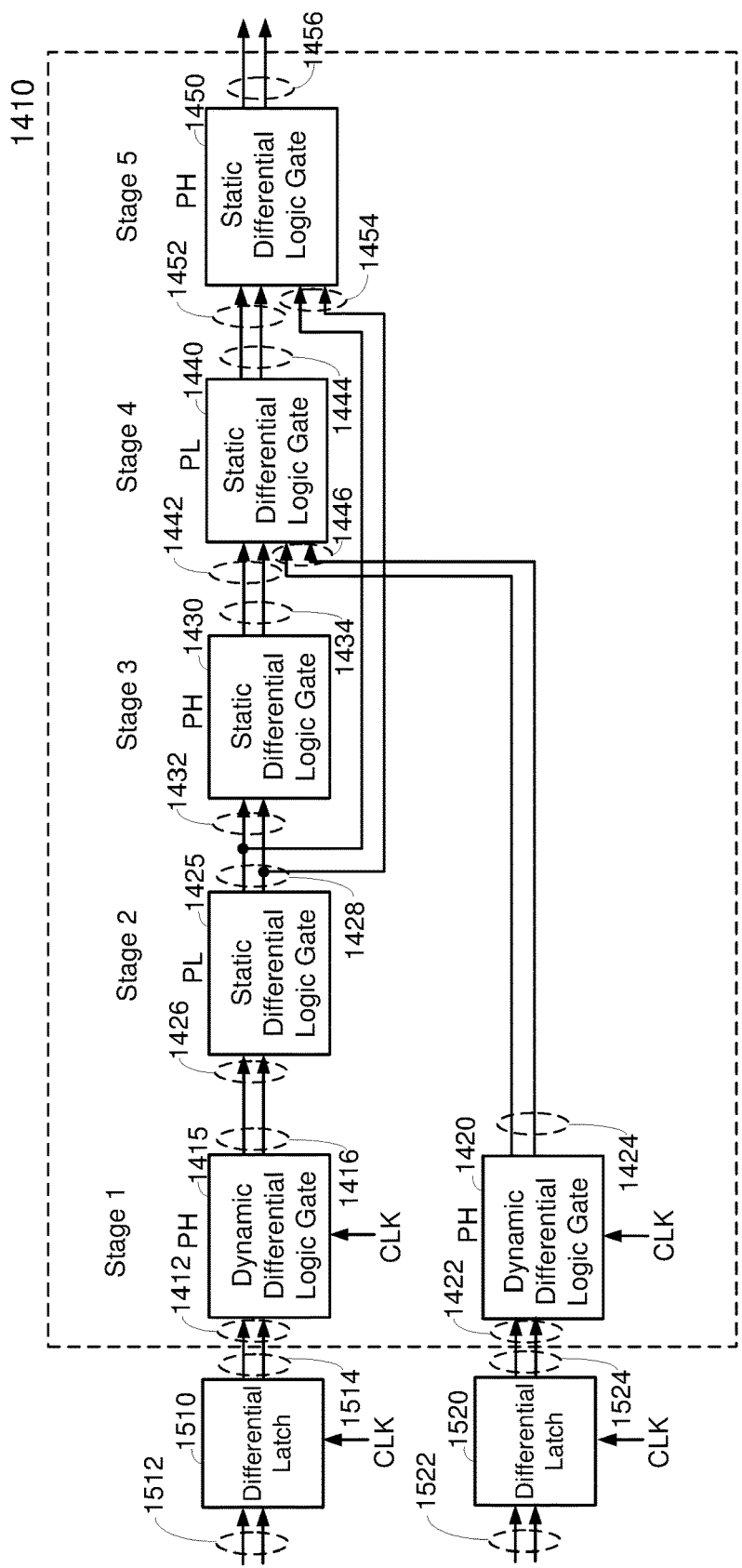
FIG. 15 shows an example of differential latches according to certain aspects of the present disclosure.

In certain aspects, incoming input data bits may be latched before being input to the pipeline 1410. In this regard, FIG. 15 shows an example of a first differential latch 1510 and a second differential latch 1520. The first differential latch 1510 has inputs 1512 configured to receive complementary input data bits, and outputs 1514 coupled to inputs 1412 of the first dynamic differential logic gate 1415. The second differential latch 1520 has inputs 1522 configured to receive complementary input data bits, and outputs 1524 coupled to inputs 1422 of the second dynamic differential logic gate 1420. Each of the differential latches 1510 and 1520 receives the clock signal CLK for timing operations of the latches.

In operation, each of the differential latches 1510 and 1520 may be open when the clock signal is low (i.e., clock low phase). During this time, the dynamic differential logic gates 1415 and 1420 may be in the preset phase, in which the dynamic differential logic gates 1415 and 1420 preset their outputs high.

Each of the differential latches 1510 and 1520 may latch the data bits at the respective inputs on a rising edge of the clock signal, and output the latched data bits to the respective dynamic differential logic gate while the clock signal is high (i.e., clock high phase). During this time, the dynamic differential logic gates 1415 and 1420 may be in the evaluation phase. The latched data bits from the differential latches 1510 and 1520 help ensure that the data bits input to the dynamic differential logic gates 1415 and 1420 are stable during the evaluation phase.

In the above example, the differential latches 1510 and 1520 are open during a clock low phase and the dynamic differential logic gates 1415 and 1420 preset their outputs during the clock low phase. However, it is to be appreciated that the present disclosure is not limited to this example. For example, the differential latches 1510 and 1520 may be open during a clock high phase and the dynamic differential logic gates 1415 and 1420 may preset their outputs during the clock high phase. In this example, the differential latches 1510 and 1520 may latch the data bits at the respective inputs on a falling edge of the clock signal, and output the latched data bits to the respective dynamic differential logic gate while the clock signal is low (i.e., clock low phase). During this time, the dynamic differential logic gates 1510 and 1520 may be in the evaluation phase.

Figure 16A:
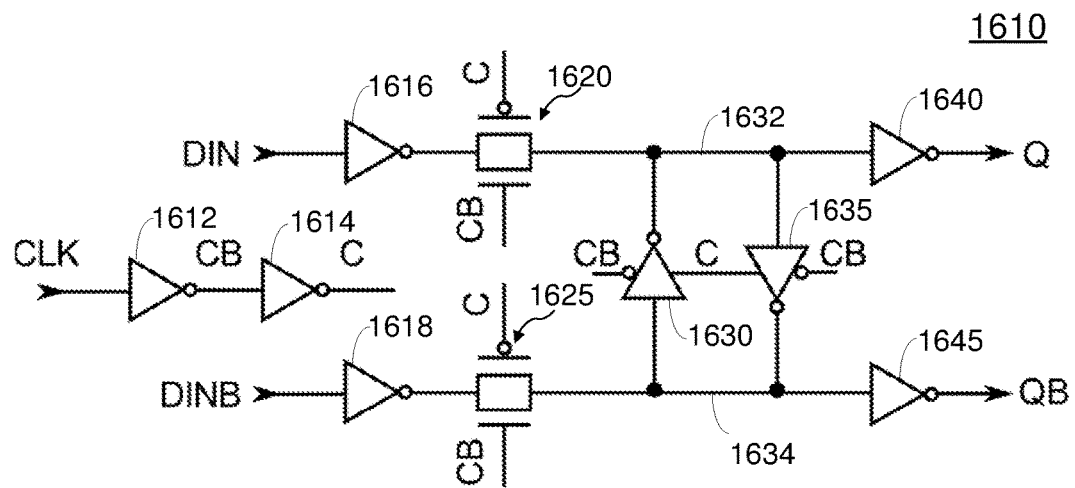
FIG. 16A shows an exemplary implementation of a differential latch according to certain aspects of the present disclosure.

FIG. 16A shows an exemplary implementation of a differential latch 1610 according to certain aspects of the present disclosure. The differential latch 1610 may be used to implement each of the differential latches 1510 and 1520 in FIG. 15. In other words, each of the differential latches 1510 and 1520 may be a separate instance (i.e., copy) of the differential latch 1610.

The differential latch 1610 includes inverters 1612 and 1614 coupled in series for generating signals CB and C from the clock signal CLK, where signal CB is an inverted version of the clock signal CLK and signal C is a delayed version of the clock signal CLK. The differential latch 1610 also includes a first transmission gate 1620, a second transmission gate 1625, a first inverter 1630, and a second inverter 1635. The first transmission gate 1620 is coupled to a true input (labeled "DIN") of the latch through inverter 1616, and the second transmission gate 1625 is coupled to a complement input (labeled "DINB") of the latch through inverter 1618. Each of the transmission gates receives signals C and CB, and is configured to open when the signals C and CB are low and high, respectively (i.e., clock signal CLK is low), and close when the signals C and CB are high and low, respectively (i.e., clock signal CLK is high). When the transmission gates 1620 and 1625 are open, the first transmission gate 1620 couples the true input to a first signal path 1632, and the second transmission gate 1625 couples the complement input to a second signal path 1634. The first signal path 1632 is coupled to a true output (labeled "Q") of the latch through inverter 1640, and the second signal path 1634 is coupled to a complement output (labeled "QB") of the latch through inverter 1645. Thus, in this example, the differential latch 1610 is open during a clock low phase.

The first inverter 1630 has an input coupled to the second signal path 1634 and an output coupled to the first signal path 1632, and the second inverter 1635 has an input coupled to the first signal path 1632 and an output coupled to the second signal path 1634. Each of the first and second inverters 1630 and 1635 receives signals C and CB, and is configured to be disabled when the signals C and CB are low and high, respectively (i.e., clock signal CLK is low), and enabled when the signals C and CB are high and low, respectively (i.e., clock signal CLK is high). Thus, the first and second inverters 1630 and 1635 are disabled during the time that the transmission gates 1620 and 1625 are open, and enabled during the time that the transmission gates 1620 and 1625 are closed.

When the first and second inverters 1630 and 1635 are enabled, the first and second inverters 1630 and 1635 (which are coupled back-to-back) latch the complementary data bits on the signal paths 1632 and 1634. The latched complementary data bits are output at the true and complement outputs Q and QB of the latch. Thus, in this example, the differential latch 1610 latches the complementary data bits at the inputs DIN and DINB of the latch on a rising edge of the clock signal, and outputs the latched complementary data bits at the outputs Q and QB of the latch during a clock high phase.

In this example, the differential latch 1610 is used to latch the true data bit and the complement data bit instead of using separate latches to separately latch the true data bit and the complement data bit. The differential latch 1610 is more resilient to timing attacks compared with using separate latches for the true data bit and the complement data bit.

Figure 16B:
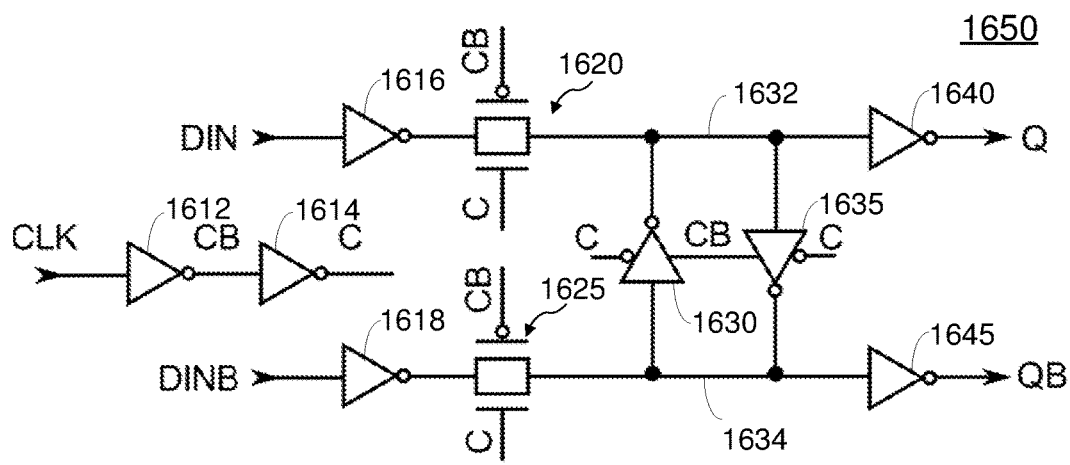
FIG. 16B shows another exemplary implementation of a differential latch according to certain aspects of the present disclosure.

FIG. 16B shows another exemplary differential latch 1650 according to certain aspects of the present disclosure. The differential latch 1650 is similar to the differential latch 1610 in FIG. 16B, in which components that are common to both latches are identified by the same reference number. The differential latch 1650 differs from the differential latch 1610 in FIG. 16A in that the signals C and CB input to the transmission gates 1620 and 1625 and the inverters 1630 and 1635 are reversed, as shown in FIG. 16B. As a result, the differential latch 1650 is open when the clock signal CLK is high (i.e., clock high phase). The differential latch 1650 latches the data bits at the inputs DIN and DINB on a falling edge of the clock signal, and outputs the latched data bits to the respective dynamic differential logic gate while the clock signal is low (i.e., clock low phase).

The exemplary differential logic gates and pipeline discussed above may be used to implement an encryption and/or decryption processor that is resilient to DPA attacks. In this regard, FIG. 17A shows an exemplary encryption processor 1705 configured to encrypt input data (labeled "plaintext") into encrypted data (labeled "ciphertext"). In this example, the encryption processor 1705 encrypts the data according to an Advanced Encryption Standard (AES) established by the National Institution of Standards and Technology (NIST). In this example, the encryption involves key addition operations, byte substitution operations, shift row operations and mix column operations, as discussed further below.

The encryption processor 1705 includes a first latch 1710, a mix column processor 1720, a first key adder 1730, a multiplexer 1735, a second latch 1740, a shift row and S-Box processor 1745, a second key adder 1725, a third key adder 1750 and a third latch 1755. The multiplexer 1735 is configured to couple the output of either the first key adder 1730 or the second key adder 1725 to the second latch 1740 based on a round select signal. As discussed further below, the encryption processor 1705 is configured to encrypt data over multiple rounds (e.g., 12 rounds) in which data is repeatedly processed by the mix column processor 1720, the first key adder 1730, and the shift row and S-Box processor 1745 over the multiple rounds to generate the encrypted data (labeled "ciphertext").

In operation, the second key adder 1725 receives the input data to be encrypted (labeled "plaintext") and adds the secret key to the input data according to the AES. The second key adder 1725 may be implemented with differential XOR gates. The multiplexer 1735 then couples the data from the second key adder 1725 to the second latch 1740, which latches the data and outputs the latched data to the shift row and S-Box processor 1745. The shift row and S-Box processor 1745 performs shift row operations and byte substitution operations on the data according to the AES (e.g., using differential XOR gates and cross wiring). The data output from the shift row and S-Box processor 1745 is then input the first latch 1710 via loop 1712. The first latch 1710 latches the data and outputs the latched data to the mix column 1720. The mix column processor 1720 performs mix column operations on the data according to the AES (e.g., using differential logic gates). The first key adder 1730 adds the secret key to the data output from the mix column processor 1720 (e.g., using differential XOR gates). The multiplexer 1735 then couples the data output from the first key adder 1730 to the second latch 1740. The above process is then repeated. In this regard, the multiplexer 1735 couples the output of the first key adder 1730 to the second latch 1740 over multiple rounds to repeat the above process over the multiple rounds.

At the end of the last round, the third key adder 1750 adds the secret key to the data output from the shift row and S-Box processor 1745. The third latch 1755 latches the data from the third key adder 1750 and outputs the latched data as the encrypted data (labeled "ciphertext").

In certain aspects, the mix column processor 1720, the first key adder 1730, and the shift row and S-box processor 1745 may be implemented using pipelines. In this regard, FIG. 17B shows a first pipeline 1760 and a second pipeline 1765 according to certain aspects of the present disclosure. The first pipeline 1760 may implement the mix column processor 1720 and the first key adder 1730 shown in FIG. 17A. In this example, the first pipeline 1760 has multiple stages in which each stage includes one or more differential logic gates. The first stage may include one or more dynamic differential logic gates while each of the subsequent stages includes one or more static differential logic gates. Note that the individual connections between the differential logic gates are not explicitly shown in FIG. 17B for ease of illustration.

In operation, the first differential latch 1710 is open when the clock signal is low (i.e., a clock low phase) and the dynamic differential logic gates in the first stage of the first pipeline 1760 preset their outputs high when the clock signal is low (i.e., a clock low phase). The high preset value at the outputs of the dynamic differential logic gates causes the static differential logic gates in the subsequent stages of the first pipeline 1760 to preset their outputs. The preset output values of the differential logic gates in the first pipeline 1760 alternate between high and low across the pipeline 1760. In FIG. 17B, the label "PH" indicates a high preset output value, and the label "PL" indicates that a low preset output value.

The first differential latch 1710 latches the data bits on a rising edge of the clock signal and outputs the latched data bits to the first pipeline 1760 while the clock signal is high (i.e., a clock high phase). The differential logic gates in the first pipeline 1760 then perform the mix column operations and the key addition operations of the mix column processor 1720 and the first key adder 1730, respectively. The output data of the first pipeline 1760 is input to the second latch 1740. In this example, the preset phase of the first pipeline 1760 corresponds to the clock low phase and the evaluation phase of the first pipeline 1760 corresponds to the clock high phase, as indicated in FIG. 17B. The first differential latch 1710 may be implemented with one or more of the differential latches 1510 and 1520 shown in FIG. 15.

The second pipeline 1765 may implement the shift row and S-Box processor 1745 shown in FIG. 17A. In this example, the second pipeline 1765 has multiple stages in which each stage includes one or more differential logic gates. The first stage may include one or more dynamic logic gates while each of the subsequent stages includes one or more static logic gates. Alternatively, the first stage may also include one or more static differential logic gates.

In operation, the second differential latch 1740 is open when the clock signal is high (i.e., a clock high phase). For the example in which the first stage of the second pipeline 1765 includes dynamic differential logic gates, the differential logic gates preset their outputs high during the clock high phase, causing the static differential logic gates in the subsequent stages of the second pipeline 1765 to preset their outputs. For the example in which the first stage of the second pipeline 1765 includes static differential logic gates, the preset output value of the last stage of the first pipeline 1760 may flow into the first stage of the second pipeline 1765 through the second differential latch 1740 during a time that the second differential latch 1740 is open. The preset output values of the differential logic gates in the second pipeline 1765 alternate between high and low, as shown in FIG. 17B.

The second differential latch 1740 latches the data bits on a falling edge of the clock signal and outputs the latched data bits to the second pipeline 1765 while the clock signal is low (i.e., a clock low phase). The differential logic gates in the second pipeline 1765 then perform the operations of the shift row and S-Box processor 1745 on the data bits. In this example, the preset phase of the second pipeline 1765 corresponds to the clock high phase and the evaluation phase of the second pipeline 1765 corresponds to the clock low phase, as indicated in FIG. 17B.

Thus, the preset phases of the first and second pipelines 1760 and 1765 correspond to opposite phases of the clock signal, and the evaluation phases of the first and second pipelines 1760 and 1765 correspond to opposite phases of the clock signal. In the above example, the preset phase and the evaluation phase of the first pipeline 1760 correspond to the clock low phase and the clock high phase, respectively, and the preset phase and the evaluation phase of the second pipeline 1765 correspond to the clock high phase and the clock low phase, respectively. However, it is to be appreciated that this may be reversed so that the preset phase and the evaluation phase of the first pipeline 1760 correspond to the clock high phase and the clock low phase, respectively, and the preset phase and the evaluation phase of the second pipeline 1765 correspond to the clock low phase and the clock high phase, respectively. In this case, the first differential latch 1710 is opened in the clock high phase and latched in the clock low phase, and the second differential latch 1740 is opened in the clock low phase and latched in the clock high phase. Each of the first differential latch 1710 and the second differential latch 1720 may be implemented with one or more of the differential latches 1510 and 1520 shown in FIG. 15.

In the above example, the first pipeline 1760 implements the mix column processor 1720 and the first key adder 1730, and the second pipeline 1765 implements the shift row and S-Box processor 1745. However, it is to be appreciated that the present disclosure is not limited to this example. In general, the operations of the mix column processor 1720, the first key adder 1730, and the shift row and S-Box processor 1745 may be split between the first pipeline 1760 and the second pipeline 1765 in a different manner without impacting functionality as long as the proper order of the operations is maintained.

Figure 18A:
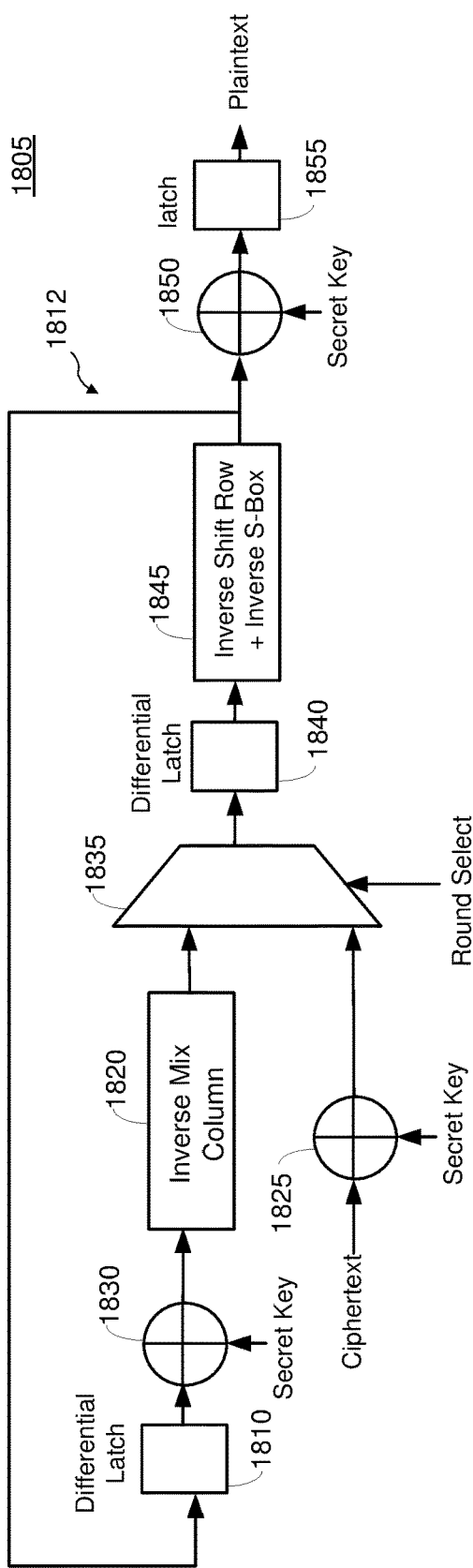
FIG. 18A shows an exemplary decryption processor according to certain aspects of the present disclosure.

FIG. 18A shows an exemplary decryption processor 1805 configured to decrypt encrypted data (labeled "ciphertext") into decrypted data (labeled "plaintext"). In this example, the decryption processor 1805 decrypts the encrypted data according to the AES. In this example, the decryption involves key addition operations, inverse byte substitution operations, inverse shift row operations and inverse mix column operations, as discussed further below.

The decryption processor 1805 includes a first latch 1810, an inverse mix column processor 1820, a first key adder 1830, a multiplexer 1835, a second latch 1840, an inverse shift row and S-Box processor 1845, a second key adder 1825, a third key adder 1850 and a third latch 1855. The multiplexer 1835 is configured to couple the output of either the inverse mix column processor 1820 or the second key adder 1825 to the second latch 1840 based on a round select signal. As discussed further below, the decryption processor 1805 is configured to decrypt data over multiple rounds (e.g., 12 rounds) in which data is repeatedly processed by the inverse mix column processor 1820, the first key adder 1830, and the inverse shift row and S-Box processor 1845 over the multiple rounds to generate the decrypted data (labeled "plaintext").

In operation, the second key adder 1825 receives the encrypted data (labeled "ciphertext") and adds the secret key to the encrypted data according to the AES. The second key adder 1825 may be implemented with differential XOR gates. The multiplexer 1835 then couples the data from the second key adder 1825 to the second latch 1840, which latches the data and outputs the latched data to the inverse shift row and S-Box processor 1845. The inverse shift row and S-Box processor 1845 performs inverse shift row operations and inverse byte substitution operations on the data according to the AES (e.g., using differential XOR gates and cross wiring). The data output from the inverse shift row and S-Box processor 1845 is then input the first latch 1810 via loop 1812. The first latch 1810 latches the data and outputs the latched data to the first key adder 1830, which adds the secret key to the data. The inverse mix column processor 1820 performs inverse mix column operations on the data from the first key adder 1830 according to the AES (e.g., using differential logic). The multiplexer 1835 then couples the data output from the inverse mix column processor 1820 to the second latch 1840. The above process is then repeated. In this regard, the multiplexer 1835 couples the output of the inverse mix column processor 1820 to the second latch 1840 over multiple rounds to repeat the above process over the multiple rounds.

At the end of the last round, the third key adder 1850 adds the secret key to the data output from the inverse shift row and S-Box processor 1845. The third latch 1855 latches the data from the third key adder 1850 and outputs the latched data as the decrypted data (labeled "plaintext").

Figure 18B:
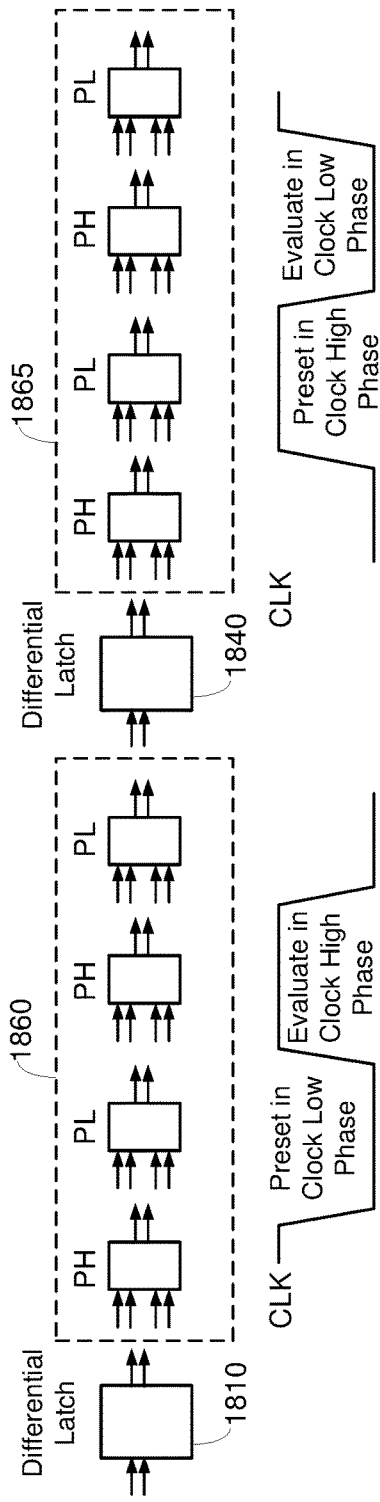
FIG. 18B shows an exemplary implementation of a portion of the decryption processor according to certain aspects of the present disclosure.

In certain aspects, the inverse mix column processor 1820, the first key adder 1830, and the inverse shift row and S-box processor 1845 may be implemented using pipelines. In this regard, FIG. 18B shows a first pipeline 1860 and a second pipeline 1865 according to certain aspects of the present disclosure. The first pipeline 1860 may implement the first key adder 1830 and inverse mix column processor 1820 shown in FIG. 18A. In this example, the first pipeline 1860 has multiple stages in which each stage includes one or more differential logic gates. The first stage may include one or more dynamic logic gates while each of the subsequent stages includes one or more static logic gates. Note that the individual connections between the differential logic gates are not explicitly shown in FIG. 18B for ease of illustration.

In operation, the first differential latch 1810 is open when the clock signal is low (i.e., a clock low phase) and the dynamic differential logic gates in the first stage of the first pipeline 1860 preset their outputs high when the clock signal is low (i.e., a clock low phase). The high preset value at the outputs of the dynamic differential logic gates causes the static differential logic gates in the subsequent stages of the first pipeline 1860 to preset their outputs. The preset output values of the differential logic gates in the first pipeline 1860 alternate between high and low across the pipeline 1860, as shown in FIG. 18B.

The first differential latch 1810 latches the data bits on a rising edge of the clock signal and outputs the latched data bits to the first pipeline 1860 while the clock signal is high (i.e., a clock high phase). The differential logic gates in the first pipeline 1860 then perform the key addition and inverse mix column operations of the first key adder 1830 and the inverse mix column processor 1820, respectively. The output data of the first pipeline 1860 is input to the second latch 1840. In this example, the preset phase of the first pipeline 1860 corresponds to the clock low phase and the evaluation phase of the first pipeline 1860 corresponds to the clock high phase, as indicated in FIG. 18B.

The second pipeline 1865 may implement the inverse shift row and S-Box processor 1845 shown in FIG. 18A. In this example, the second pipeline 1865 has multiple stages in which each stage includes one or more differential logic gates. The first stage may include one or more dynamic logic gates while each of the subsequent stages includes one or more static logic gates. Alternatively, the first stage may also include one or more static differential logic gates.

In operation, the second differential latch 1840 is open when the clock signal is high (i.e., a clock high phase). For the example in which the first stage of the second pipeline 1865 includes dynamic differential logic gates, the differential logic gates preset their outputs high during the clock high phase, causing the static differential logic gates in the subsequent stages to preset their outputs. For the example in which the first stage of the second pipeline 1865 includes static differential logic gates, the preset output value of the last stage of the first pipeline 1860 may flow into the first stage of the second pipeline 1865 through the second differential latch 1840 during a time that the second differential latch 1840 is open. The preset output values of the differential logic gates in the second pipeline 1865 alternate between high and low, as shown in FIG. 18B.

The second differential latch 1840 latches the data bits on a falling edge of the clock signal and outputs the latched data bits to the second pipeline 1865 while the clock signal is low (i.e., a clock low phase). The differential logic gates in the second pipeline 1865 then perform the operations of the inverse shift row and S-Box processor 1845 on the data bits. In this example, the preset phase of the second pipeline 1865 corresponds to the clock high phase and the evaluation phase of the second pipeline 1865 corresponds to the clock low phase, as indicated in FIG. 18B.

Thus, the preset phases of the first and second pipelines 1860 and 1865 correspond to opposite phases of the clock signal, and the evaluation phases of the first and second pipelines 1860 and 1865 correspond to opposite phases of the clock signal. In the above example, the preset phase and the evaluation phase of the first pipeline 1860 correspond to the clock low phase and the clock high phase, respectively, and the preset phase and the evaluation phase of the second pipeline 1865 correspond to the clock high phase and the clock low phase, respectively. However, it is to be appreciated that this may be reversed so that the preset phase and the evaluation phase of the first pipeline 1860 correspond to the clock high phase and the clock low phase, respectively, and the preset phase and the evaluation phase of the second pipeline 1865 correspond to the clock low phase and the clock high phase, respectively. In this case, the first differential latch 1810 is opened in the clock high phase and latched in the clock low phase, and the second differential latch 1840 is opened in the clock low phase and latched in the clock high phase. Each of the first differential latch 1810 and the second differential latch 1820 may be implemented with one or more of the differential latches 1510 and 1520 shown in FIG. 15.

In the above example, the first pipeline 1860 implements the first key adder 1830 and the inverse mix column processor 1820, and the second pipeline 1865 implements the inverse shift row and S-Box processor 1845. However, it is to be appreciated that the present disclosure is not limited to this example. In general, the operations of the first key adder 1830, the inverse mix column processor 1820, and the inverse shift row and S-Box processor 1845 may be split between the first pipeline 1860 and the second pipeline 1865 in a different manner without impacting functionality as long as the proper order of the operations is maintained.

It is to be understood that present disclosure is not limited to the terminology used above to describe aspects of the present disclosure. For example, it is to be appreciated that logic one and zero may also be referred to as high and low, respectively, dynamic may also be referred to as clocked, preset may also be referred to as precharge, a logic value may also be referred to as a logic state, and a logic operation may also be referred to as a logic function.

It is also to be understood that the present disclosure is not limited to the particular arrangement of inputs a, $\bar{a}$, b and $\bar{b}$ shown in each of FIGS. 5, 7, 10 and 12. In this regard, it is to be appreciated that, for each of the differential logic gates 510, 1010 and 1210 shown in these figures, there are several possible arrangements for the inputs a, $\bar{a}$, b and $\bar{b}$ that achieve the functions of the differential logic gate discussed above. For example, in FIG. 5, the arrangement of inputs a and $\bar{b}$ to the gates of the first PFET 412(1) and the second PFET 414(1) may be inverted such that input $\bar{b}$ is coupled to the gate of the first PFET 412(1) and input a is coupled to the gate of the second PFET 414(1). In this example, the functions of the XOR gate 520 discussed above stay the same. Accordingly, it is to be appreciated that the present disclosure covers the other possible arrangements for inputs a, $\bar{a}$, b and $\bar{b}$ for each gate.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A circuit comprising:
   a dynamic differential logic gate having first and second outputs; and
   a first static differential logic gate having first and second outputs, and first and second inputs coupled to the first and second outputs, respectively, of the dynamic differential logic gate;
   wherein the dynamic differential logic gate is configured to receive a clock signal and to preset both the first and second outputs of the dynamic differential logic gate to a first preset value during a first phase of the clock signal; and
   wherein the first static differential logic gate is configured to preset both the first and second outputs of the first static differential logic gate to a second preset value when the first preset value is input to both the first and second inputs of the first static differential logic gate.

2. The circuit of claim 1, wherein the first preset value and the second preset value have opposite logic values.

3. The circuit of claim 1, wherein the first dynamic differential logic gate comprises a dynamic differential exclusive-or (XOR) gate.

4. The circuit of claim 1, wherein, during a second phase of the clock signal, the dynamic differential logic gate is configured to:
   perform a first differential logic function on input data bits to generate a first pair of complementary data bits; and
   output the first pair of complementary data bits at the first and second outputs of the dynamic differential logic gate.

5. The circuit of claim 4, wherein the first static differential logic gate is configured to:
   perform a second differential logic function on at least the first pair of complementary data bits to generate a second pair of complementary data bits; and
   output the second pair of complementary data bits at the first and second outputs of the first static differential logic gate.

6. The circuit of claim 5, wherein the clock signal is low during the first phase of the clock signal, and high during the second phase of the clock signal.

7. The circuit of claim 5, wherein the clock signal is high during the first phase of the clock signal, and low during the second phase of the clock signal.

8. The circuit of claim 5, further comprising:
   a second static differential logic gate having first and second outputs, and first and second inputs coupled to the first and second outputs, respectively, of the first static differential logic gate;
   wherein the second static differential logic gate is configured to preset both the first and second outputs of the second static differential logic gate to the first preset value when the second preset value is input to both the first and second inputs of the second static differential logic gate.

9. The circuit of claim 8, wherein the first preset value and the second preset value have opposite logic values.

10. The circuit of claim 5, wherein the first differential logic function is a differential exclusive-or (XOR) function.

11. A processor comprising:
    a first differential latch configured to latch first complementary data, and to output the latched first complementary data; and
    a first pipeline configured to perform first operations on the latched first complementary data to generate second complementary data;
    wherein the first pipeline comprises one or more dynamic differential logic gates in a first stage of the first pipeline, and one or more static differential logic gates in a second stage of the first pipeline; and
    wherein each of the one or more dynamic differential logic gates in the first stage is configured to receive a clock signal and to preset respective outputs to a first preset value during a first phase of the clock signal.

12. The processor of claim 11, wherein each of the one or more static differential logic gates in the second stage is configured to preset respective outputs to a second preset value when the outputs of the one or more dynamic differential logic gates in the first stage are preset to the first preset value.

13. The processor of claim 12, wherein the first preset value and the second preset value have opposite logic values.

14. The processor of claim 13, wherein:
    the first pipeline comprises one or more static differential logic gates in a third stage of the first pipeline; and
    each of the one or more static differential logic gates in the third stage is configured to preset respective outputs to the first preset value when the outputs of the one or more static differential logic gates in the second stage are preset to the second preset value.

15. The processor of claim 12, wherein the first differential latch is configured to output the latched first complementary data to the first pipeline during a second phase of the clock signal.

16. The processor of claim 15, wherein the clock signal is low during the first phase of the clock signal and high during the second phase of the clock signal.

17. The processor of claim 11, further comprising:
    a second differential latch configured to latch the second complementary data, and to output the latched second complementary data; and
    a second pipeline configured to perform second operations on the latched second complementary data to generate third complementary data.

18. The processor of claim 17, wherein:
    the first differential latch is configured to output the latched first complementary data to the first pipeline during a second phase of the clock signal; and
    the second differential latch is configured to output the latched second complementary data to the second pipeline during the first phase of the clock signal.

19. The processor of claim 18, wherein the clock signal is low during the first phase of the clock signal and the clock signal is high during the second phase of the clock signal.

20. The processor of claim 18, wherein the second pipeline comprises one or more static differential logic gates in a first stage of the second pipeline.

21. The processor of claim 17, wherein:
    the first operations include mix column operations or inverse mix column operations; and
    the second operations include byte substitution operations or inverse byte substitution operations.

22. A differential logic gate comprising:
    a first logic gate comprising:
       a first plurality of p-type field effect transistors (PFETs) coupled in series between a first output and a supply rail;
       a second plurality of PFETs coupled in series between the first output and the supply rail;

a first plurality of n-type field effect transistors (NFETs) coupled in series between the first output and a ground;

a second plurality of NFETs coupled in series between the first output and the ground;

a first conduction path between a first node and a second node, wherein the first node is between two PFETs in the first plurality of PFETs and the second node is between two NFETs in the first plurality of NFETs; and a second conduction path between a third node and a fourth node, wherein the third node is between two PFETs in the second plurality of PFETs and the fourth node is between two NFETs in the second plurality of NFETs; and a second logic gate comprising:

a third plurality of PFETs coupled in series between a second output and the supply rail;

a fourth plurality of PFETs coupled in series between the second output and the supply rail;

a third plurality of NFETs coupled in series between the second output and the ground; and a fourth plurality of NFETs coupled in series between the second output and the ground; and a plurality of inputs coupled to gates of the first, second, third and fourth pluralities of PFETs and gates of the first, second, third and fourth pluralities of NFETs such that the differential logic gate performs a differential logic function when a first pair of complementary bits is input to first and second ones of the plurality of inputs, and a second pair of complementary bits is input to third and fourth ones of the plurality of inputs.

23. The differential logic gate of claim 22, wherein the plurality of inputs are coupled to the gates of the first, second, third and fourth pluralities of PFETs and the gates of the first, second, third and fourth pluralities of NFETs such that both the first and second outputs are preset to a first preset value when a second preset value is input to the first, second, third and fourth ones of the plurality of inputs.

24. The differential logic gate of claim 23, wherein the first preset value and the second preset value have opposite logic values.

25. The differential logic gate of claim 22, wherein the differential logic function is one of a differential OR function, and a differential AND function.

26. The differential logic gate of claim 22, wherein the first logic gate and the second logic gate are complementary to one another.

27. The differential logic gate of claim 22, wherein the second logic gate further comprises:

a third conduction path between a fifth node and a sixth node, wherein the fifth node is between two PFETs in the third plurality of PFETs and the sixth node is between two NFETs in the third plurality of NFETs; and a fourth conduction path between a seventh node and an eighth node, wherein the seventh node is between two PFETs in the fourth plurality of PFETs and the eighth node is between two NFETs in the fourth plurality of NFETs.

* * * * *